INVENTOR
WILLIAM R. UTTAL
BY John J. Goodwin
ATTORNEY

Dec. 17, 1963 W. R. UTTAL 3,114,210

EDUCATIONAL DEVICE

Filed Oct. 10, 1961 21 Sheets-Sheet 2

Dec. 17, 1963 W. R. UTTAL 3,114,210

EDUCATIONAL DEVICE

Filed Oct. 10, 1961 21 Sheets-Sheet 3

Dec. 17, 1963 W. R. UTTAL 3,114,210

EDUCATIONAL DEVICE

Filed Oct. 10, 1961 21 Sheets-Sheet 4

Dec. 17, 1963 W. R. UTTAL 3,114,210

EDUCATIONAL DEVICE

Filed Oct. 10, 1961 21 Sheets-Sheet 5

Dec. 17, 1963 W. R. UTTAL 3,114,210

EDUCATIONAL DEVICE

Filed Oct. 10, 1961 21 Sheets-Sheet 6

Dec. 17, 1963 W. R. UTTAL 3,114,210

EDUCATIONAL DEVICE

Filed Oct. 10, 1961 21 Sheets-Sheet 10

Dec. 17, 1963 W. R. UTTAL 3,114,210

EDUCATIONAL DEVICE

Filed Oct. 10, 1961 21 Sheets-Sheet 11

Dec. 17, 1963 W. R. UTTAL 3,114,210

EDUCATIONAL DEVICE

Filed Oct. 10, 1961 21 Sheets-Sheet 16

United States Patent Office 3,114,210

Patented Dec. 17, 1963

3,114,210

EDUCATIONAL DEVICE

William R. Uttal, Yorktown Heights, N.Y., assignor to International Business Machines Corporation, New York, N.Y., a corporation of New York Filed Oct. 10, 1961, Ser. No. 144,116
10 Claims. (Cl. 35—6)

The present invention relates to automated teaching devices, and more particularly to an automated apparatus for teaching mental concepts and associated pyschomotor skills.

The class of devices commonly referred to in the art as "Teaching Machines" or "Educational Devices" have heretofore been limited in the extent to which the student or operator may be aided in the learning process. There is a wide assortment of teaching machines with many diverse applications, but these devices may be roughly divided into two categories. The most basic sub-class of teaching devices are those which can be considered "open-loop" arrangements. That is, those devices having no capabilities for accepting student responses. Examples of "open-loop" devices are recorded instructional material presentations such as foreign language instruction, phonograph records, or cinema training films. The "open-loop" devices suffer from the disadvantage that there is no provision for communication from the student to the machine.

A more improved group of teaching devices are those which may be termed "feedback" devices wherein student answers or responses are accepted and evaluated, and the student may be apprised of his progress. Devices which fall into this latter group are superior as they provide for dynamic interaction and permit student-teacher rapport, an established advantage in the learning process.

However, in the present state of the art the efficacy of the "feedback" type teaching machine has been limited by lack of flexibility in distinct and critical areas such as the extent of student response, for example, requiring the student to select one of a multiple of displayed answers rather than permit the student to construct an answer; presenting a standard fixed curriculum to all students rather than adjusting to their separate degrees of proficiency; inability to adjust to the increasing proficiency of a given student with time, such as eliminating those portions of the curriculum with which the student has demonstrated his proficiency or repeating those portions with which the student is weak; inability to provide the correct answer rather than a mere error indication when the student has made a mistake; and the inability to consider the time which elapses between the presentation of the problem and the student's answer, a factor which is particularly significant in the teaching of psychomotor skills.

The above mentioned limitations have been recognized and attempts have been made to overcome one or more of these difficulties. In U.S. Patent No. 2,846,779 to B. F. Skinner, issued August 12, 1958, and assigned to the present assignee, a teaching machine is described wherein the subject material is presented at a rate determined by the student's progress. Again in U.S. Patent No. 2,965,975, to L. J. Briggs, issued December 27, 1960, a machine is shown in which the learning rate is dependent upon the individual student and further, the student is instructed only in his deficient areas and active participation by the student is required.

Generally, the prior art devices have been restricted to the teaching of mental concepts such as mathematics, foreign language, spelling, and the like. The mechanism employed for the student's response, commonly a form of push button device, is utilized to convey a mental concept to the machine and has no direct relation to the subject matter. In the present invention, the student input mechanism is a distinct feature of the learning process, such that the student not only learns a mental concept but also a psycho-motor skill associated with the mental concept. Thus, a student learning to use a keypunch machine may simultaneously learn the meaning of the keypunch code (mental concept) and to learn to rapidly operate the keypunch keyboard (psycho-motor skill) in which case a keypunch keyboard would be adapted as the student input mechanism. Another example of associated mental and psycho-motor skills would be the learning of stenographic characters and the operation of the stenotype machine, in which case a stenotype keyboard would be employed as the input mechanism.

The basic features of the present invention include the provision of a memory element for programmed subject material that is capable of both random and sequential access, a machine to student communicating device for presenting the increments of the subject matter, a student to machine input device through which a constructed answer is entered and which is arranged to teach a psycho-motor skill associated with the subject material, a performance monitoring feature including an answer correctness evaluator and indicator, and a prompting feature controlled by a time element; and a program presentation governor that is responsive both to the rate of the student and to the student's errors. That is, the program presentation governor can classify the type of errors the student tends to make and then present new problems having subject matter with which the student has a demonstrated weakness. These components cooperate in the over-all educational device of this invention to permit the student to progress at his own rate, to have his rate of progress govern the difficulty, and the quantity of subject material considered and to permit the programmed presentation to be adapted to the various rules of learning uncovered by the art as it develops.

It is an object of the present invention to provide an educational apparatus for the teaching of mental concepts and associated psycho-motor skills.

Another object of the present invention is to provide an improved educational apparatus having large range of dynamic interaction between the apparatus and the student.

Another object of the present invention is to provide an improved educational apparatus wherein student replies are constructed rather than selected.

A further object of the present invention is to provide an improved educational apparatus having immediate error correction.

A still further object of the present invention is to provide an improved educational apparatus wherein a student learns at a rate suited to his ability.

A still further object of the present invention is to provide an improved educational apparatus wherein subject matter in which the student is deficient is repeated and the subject matter in which the student is proficient is bypassed.

A still further object of the present invention is to provide an improved educational apparatus wherein new problems are presented to the student having subject matter with which the student has a demonstrated weakness.

Another object of the present invention is to provide an improved educational apparatus wherein time of response is a factor.

The foregoing and other objects, features, and advantages of the invention will be apparent from the following more particular description of preferred embodiments of the invention, as illustrated in the accompanying drawings.

In the drawings:

FIGS. 1A, 1B, and 1C form a functional block diagram of a preferred embodiment of an educational apparatus for teaching stenotyping following the principles of the present invention;

Figure 1A:
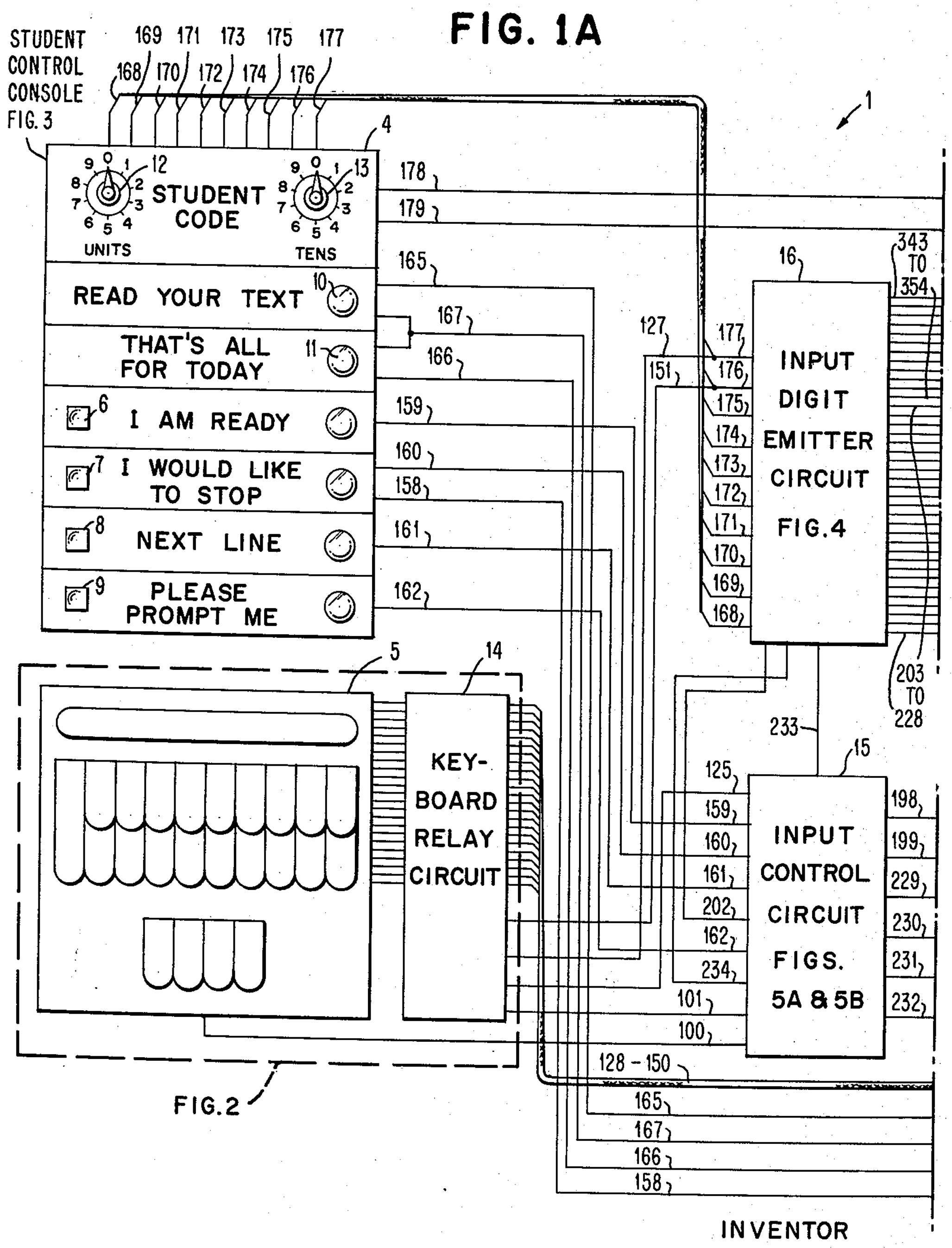
Figure 1:
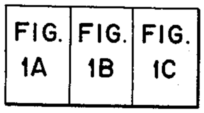
Figure 1B:
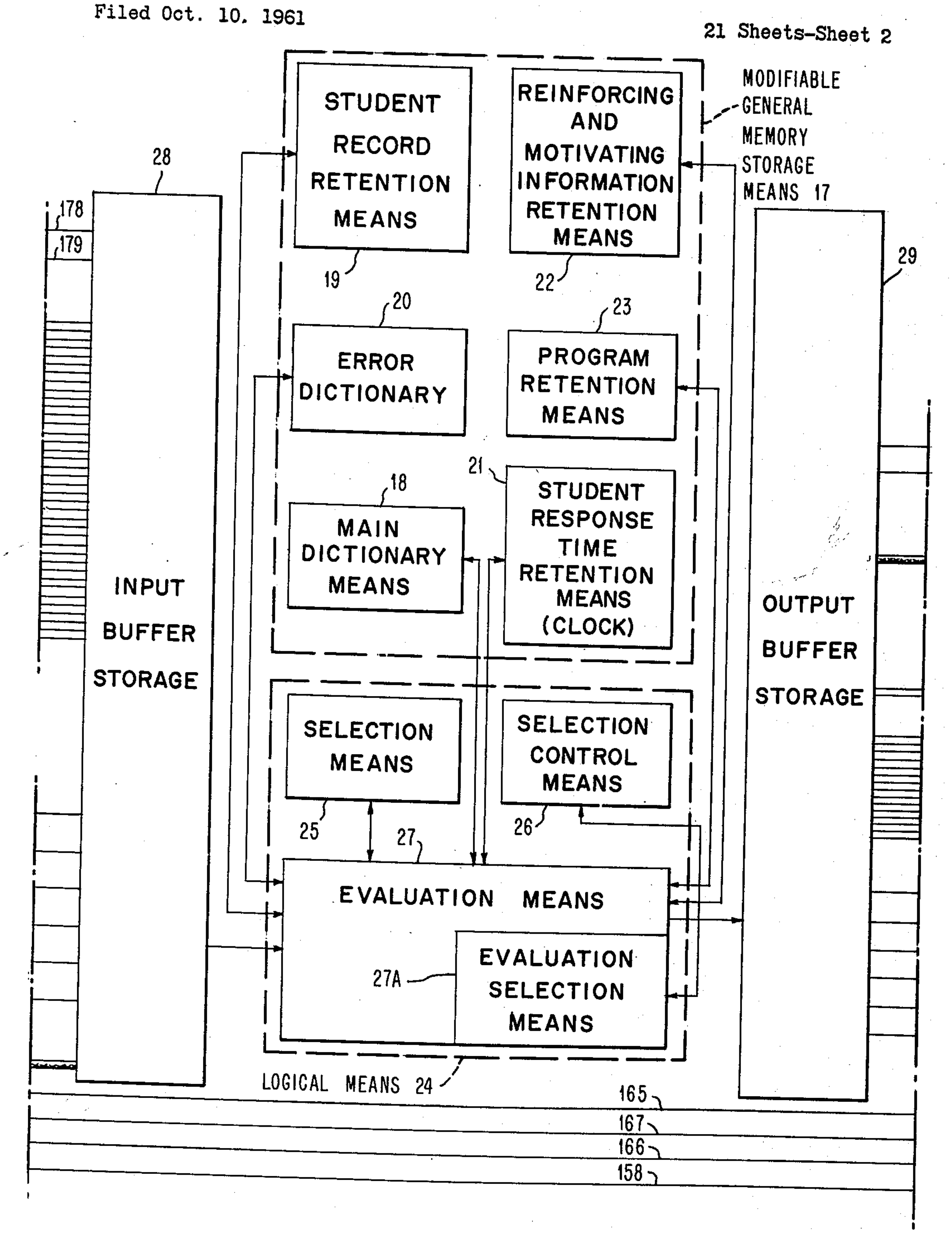
Figure 1C:
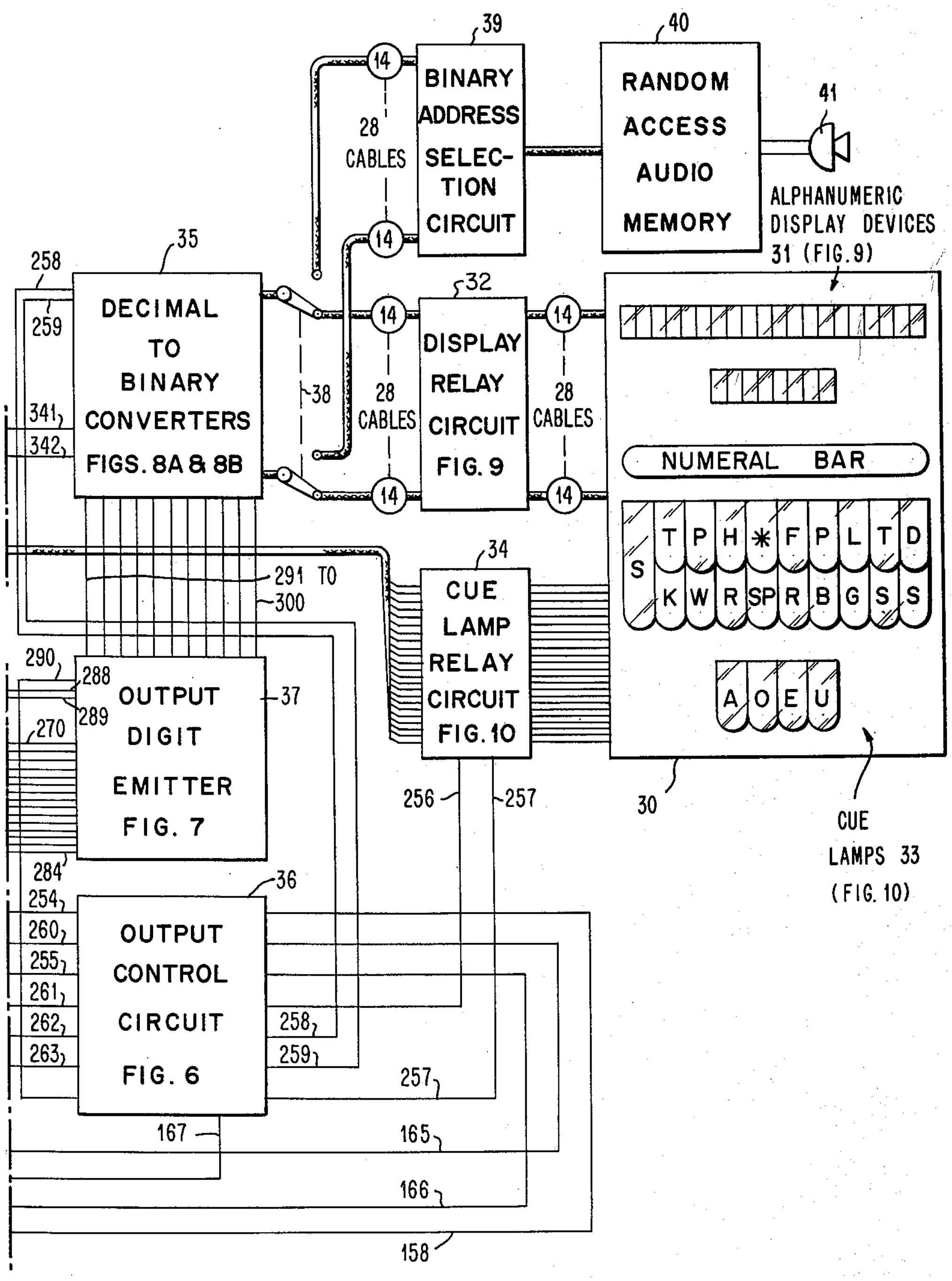
Figures 5, 5A:
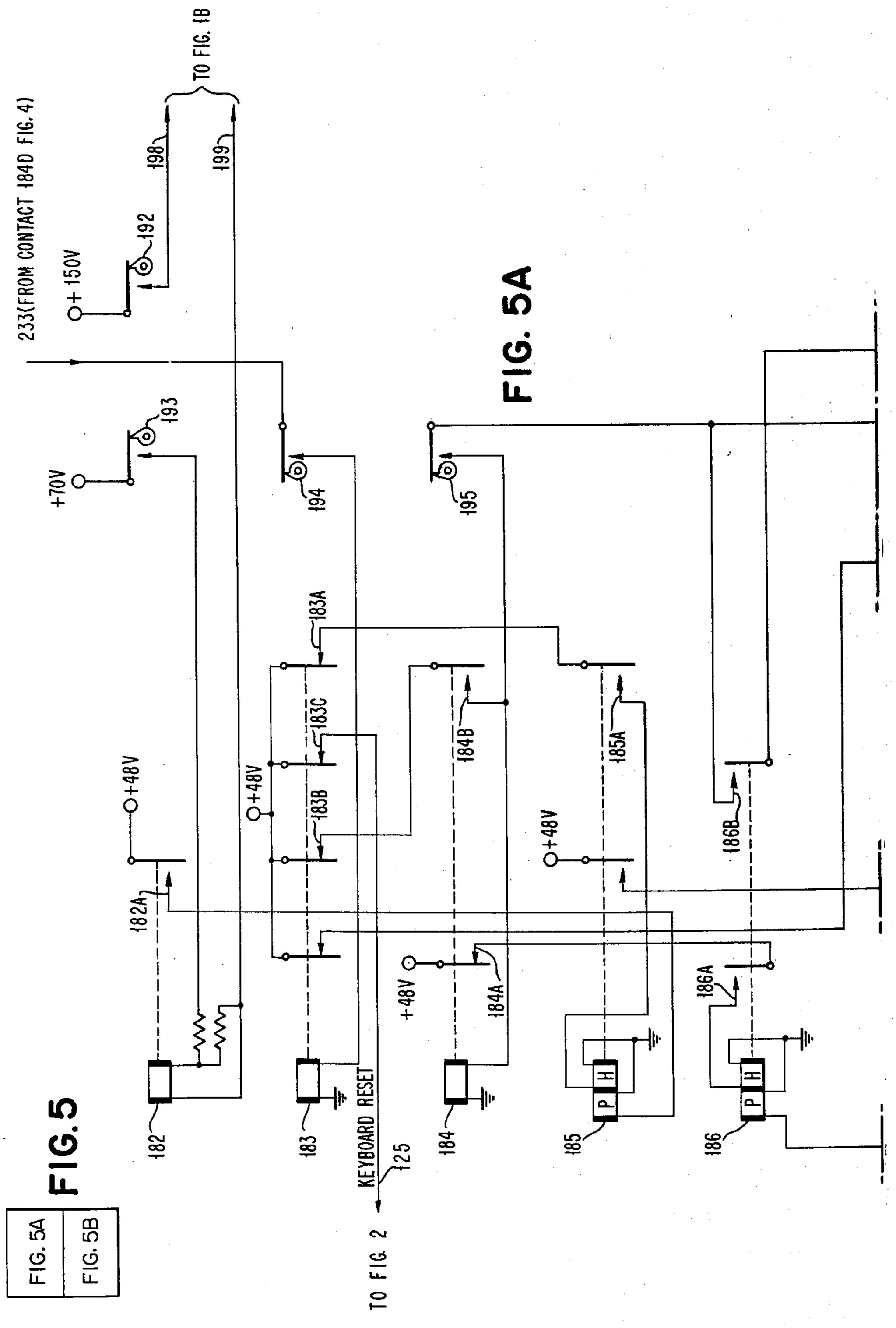
Figure 5B:
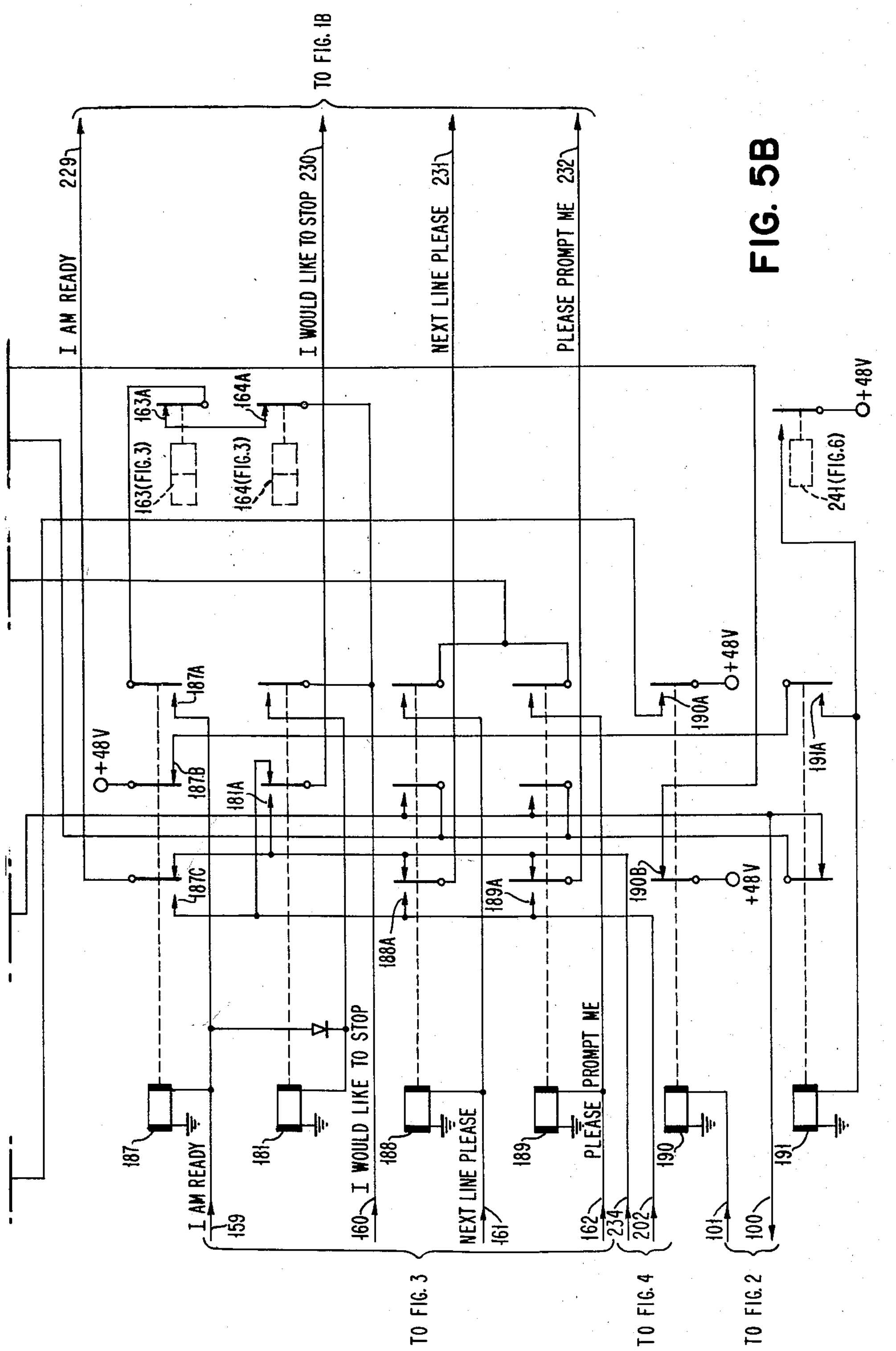
Figure 6:
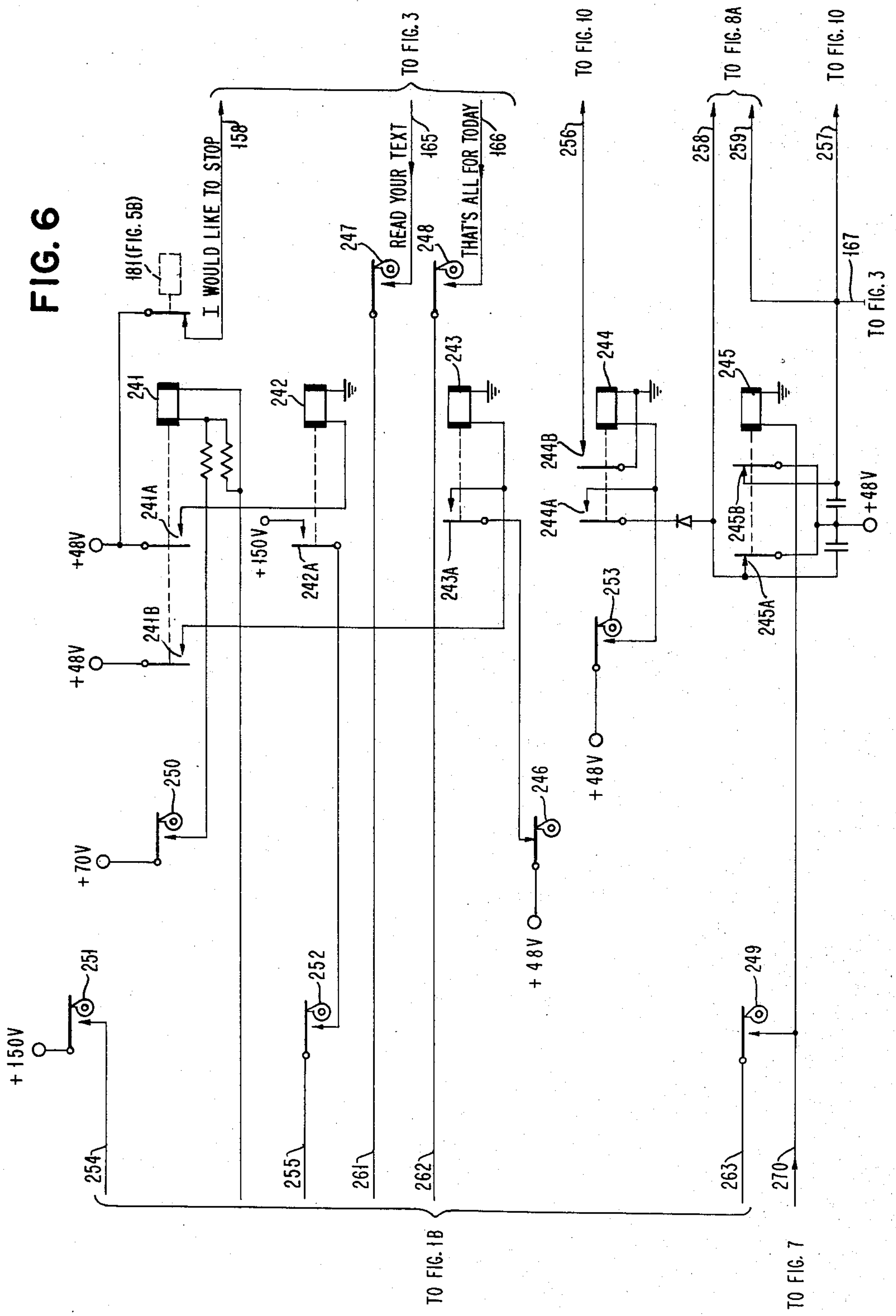
Figure 7:
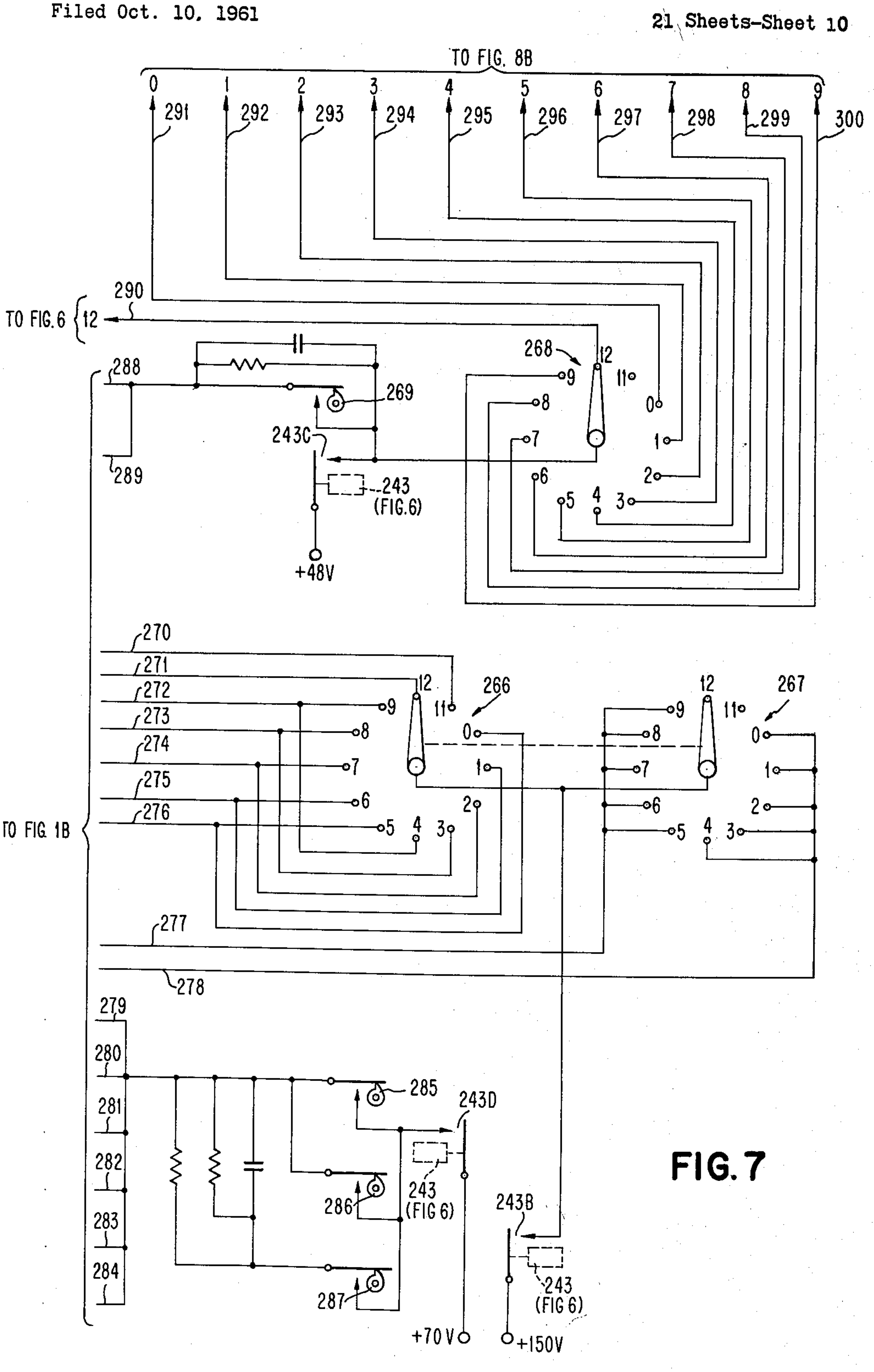
Figures 8, 8A:
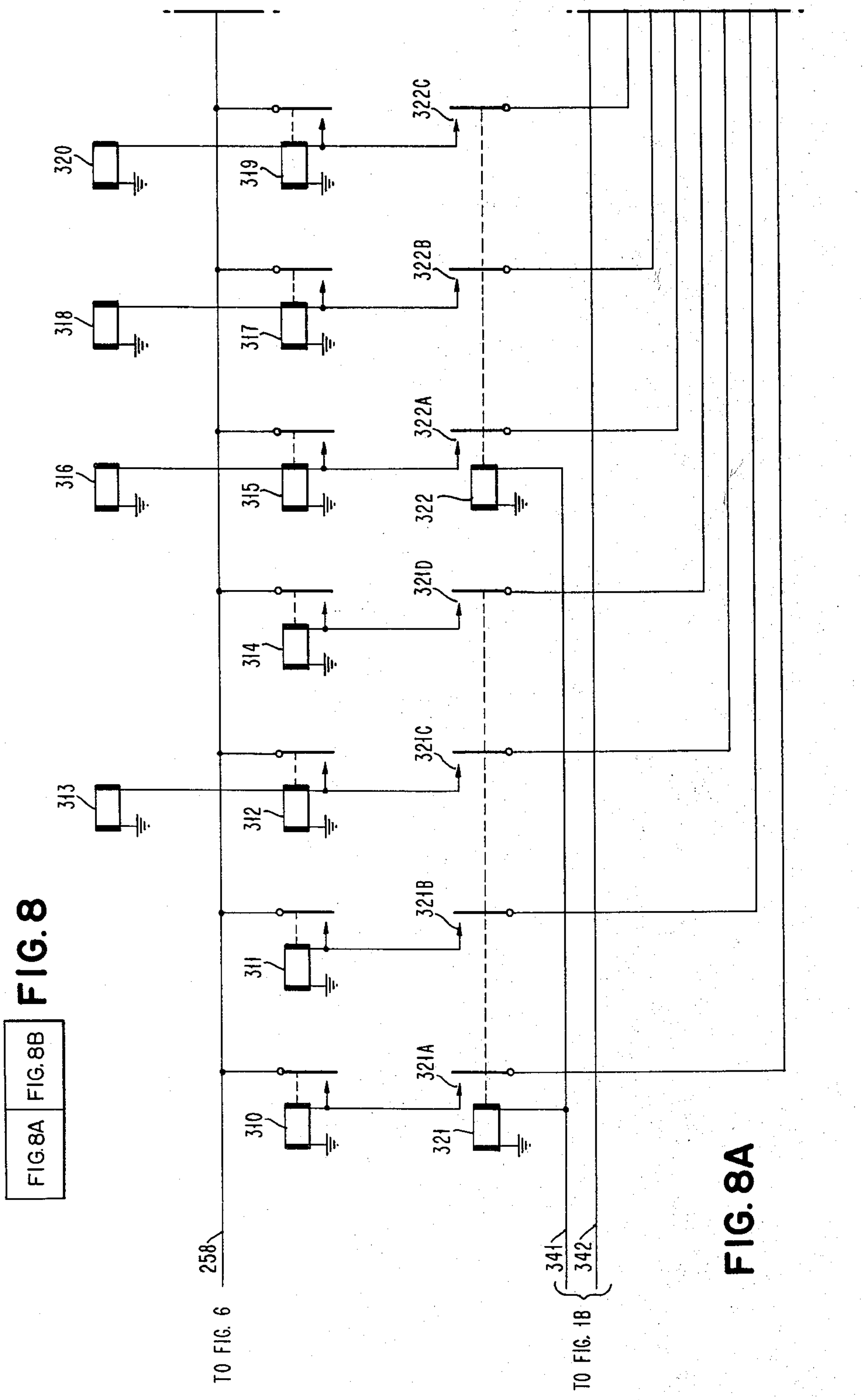
Figure 8B:
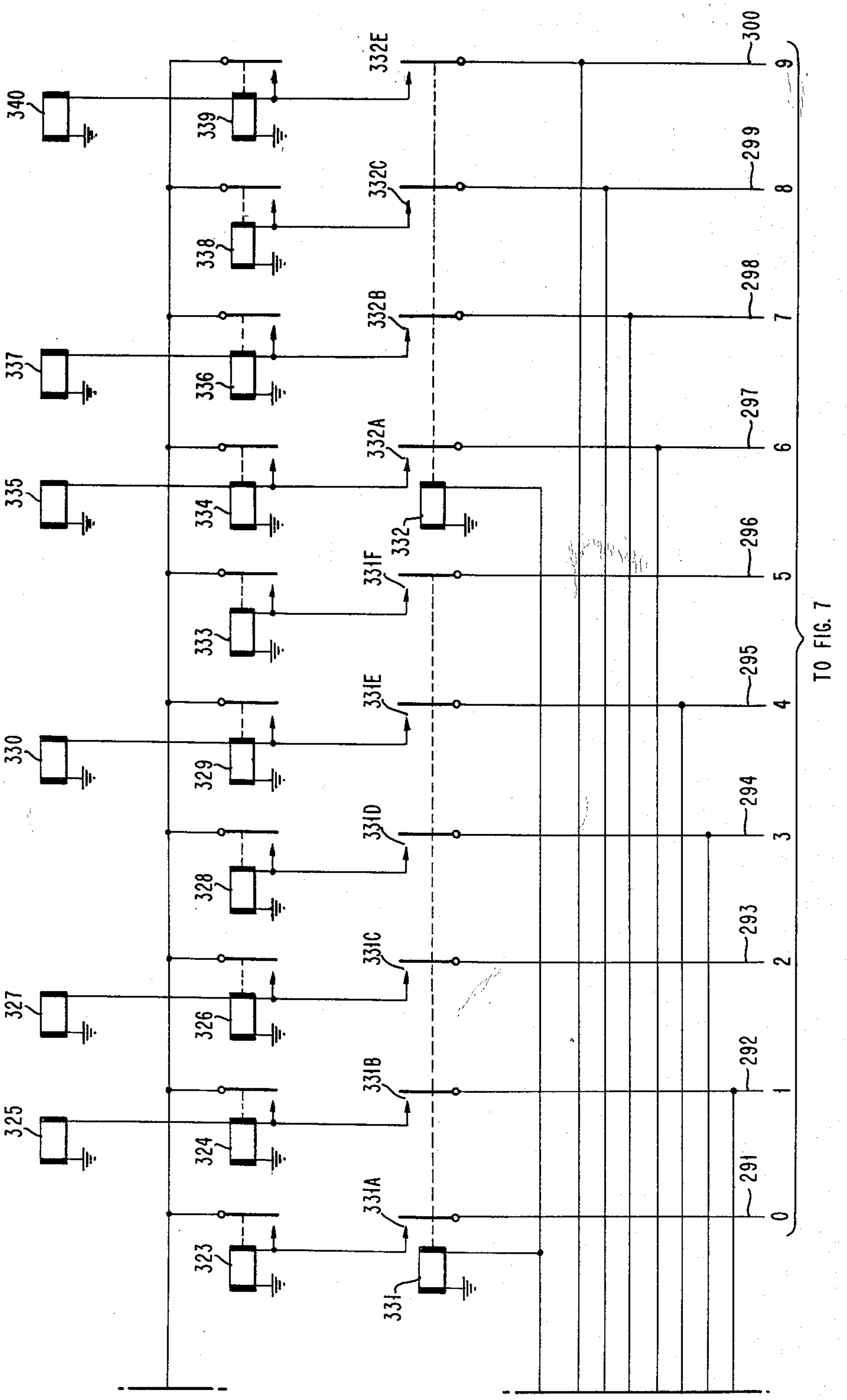
Figure 8C:
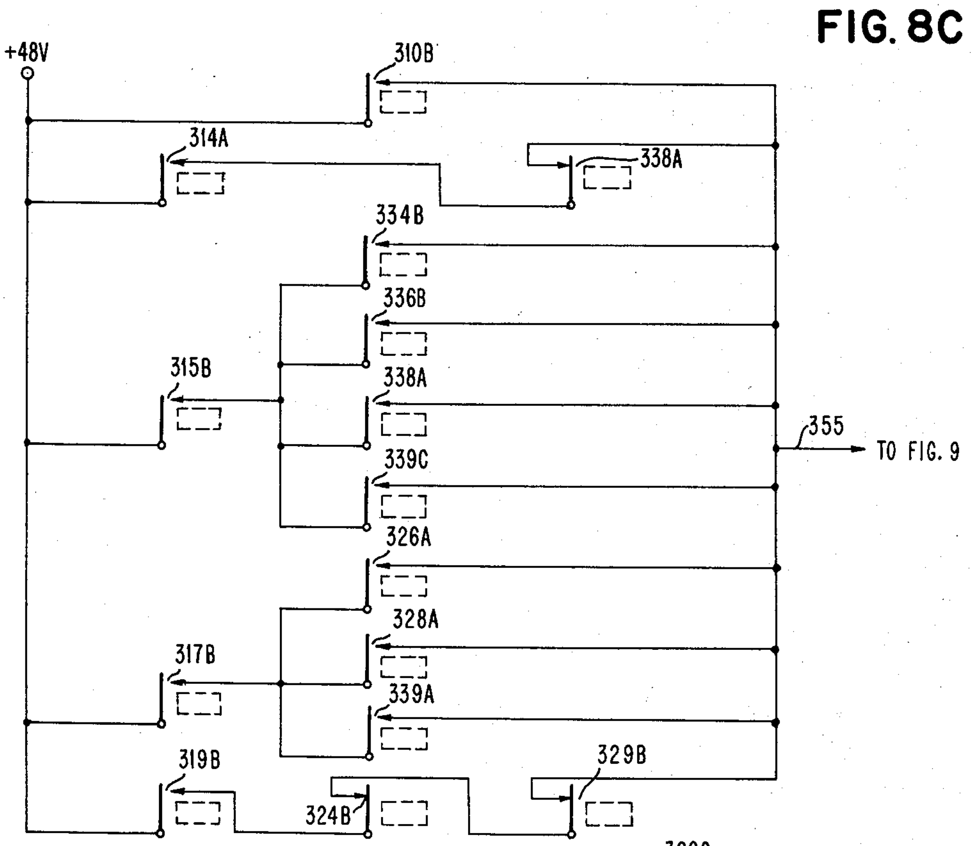
Figure 8D:
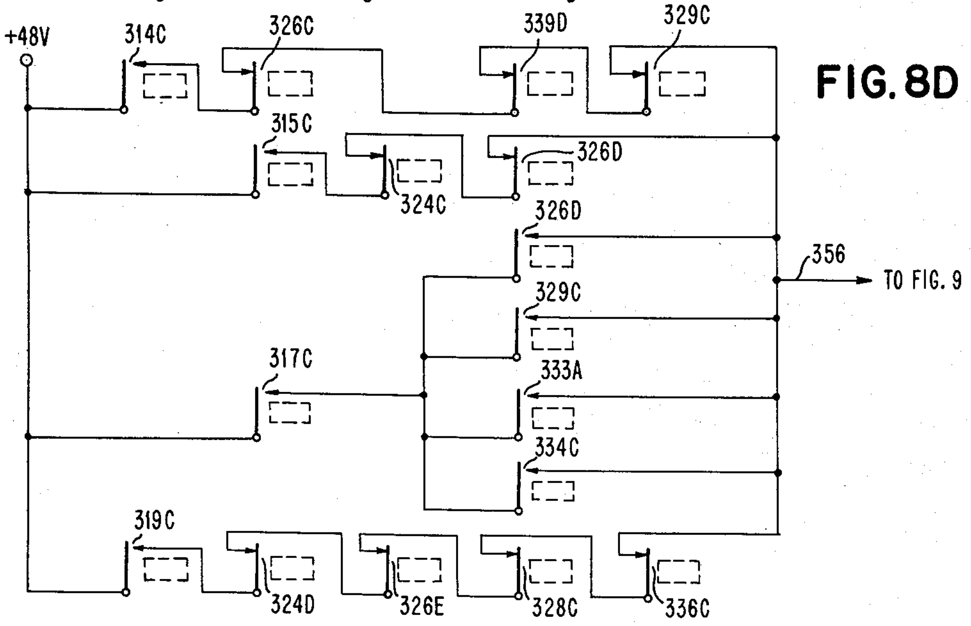
Figure 8E:
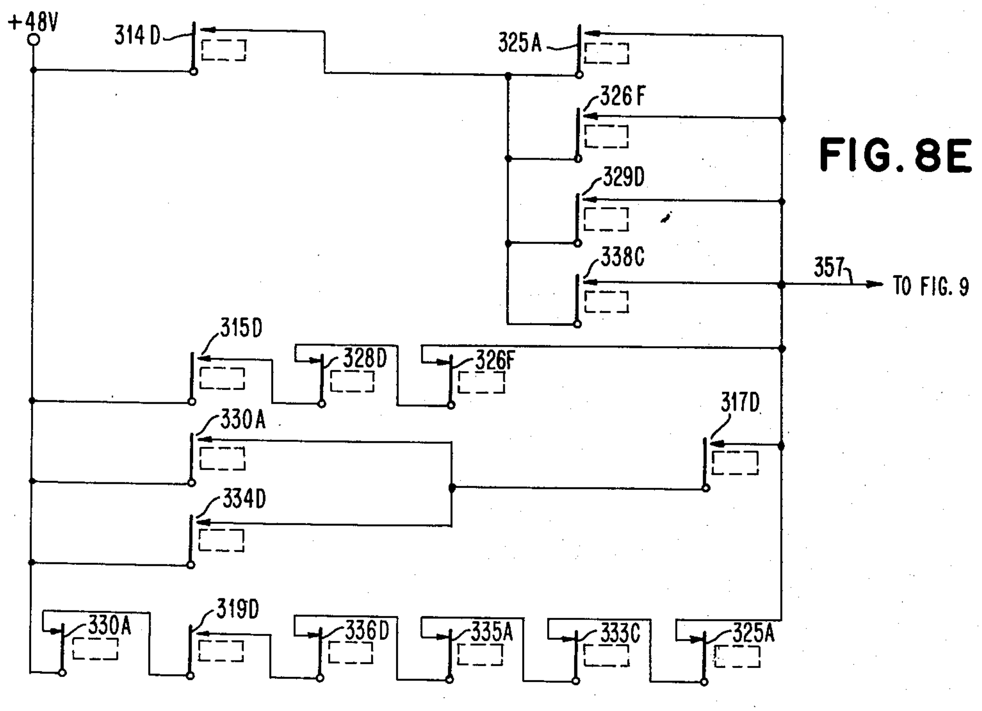
Figure 8F:
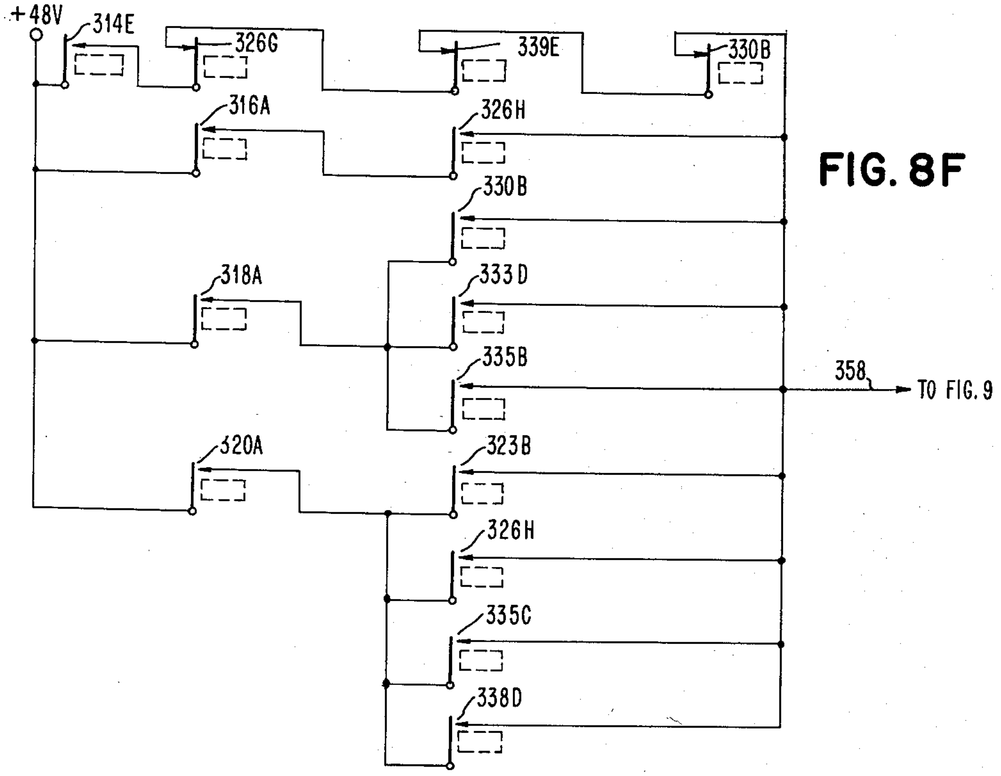
Figure 8G:
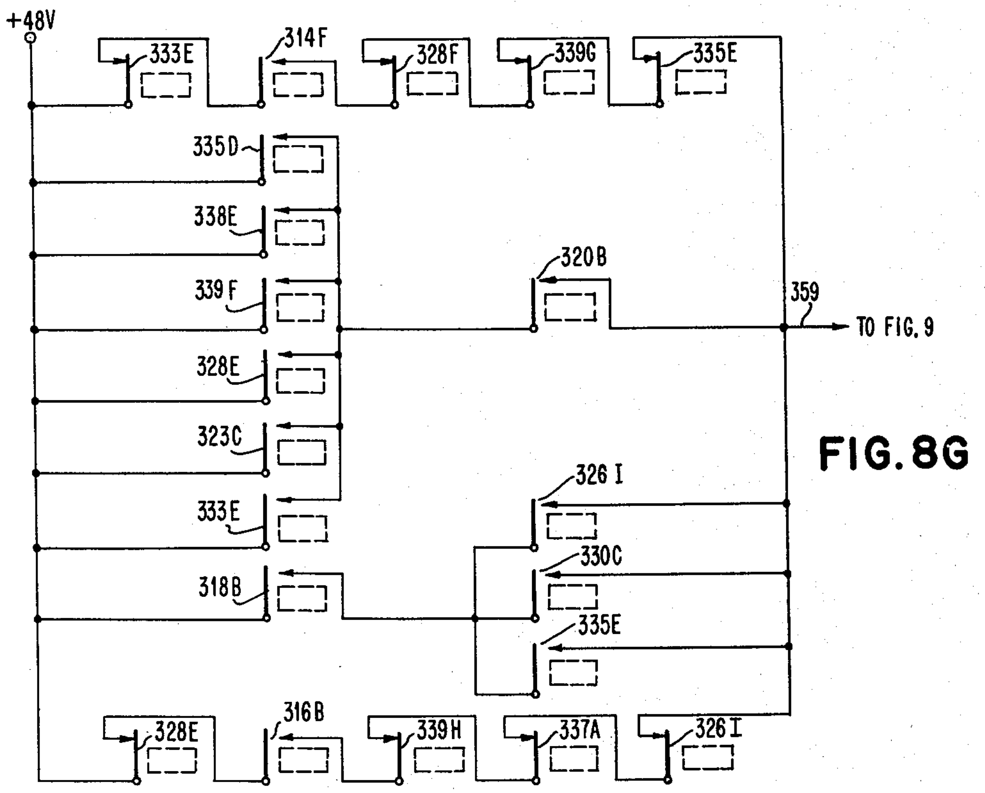
Figure 8H:
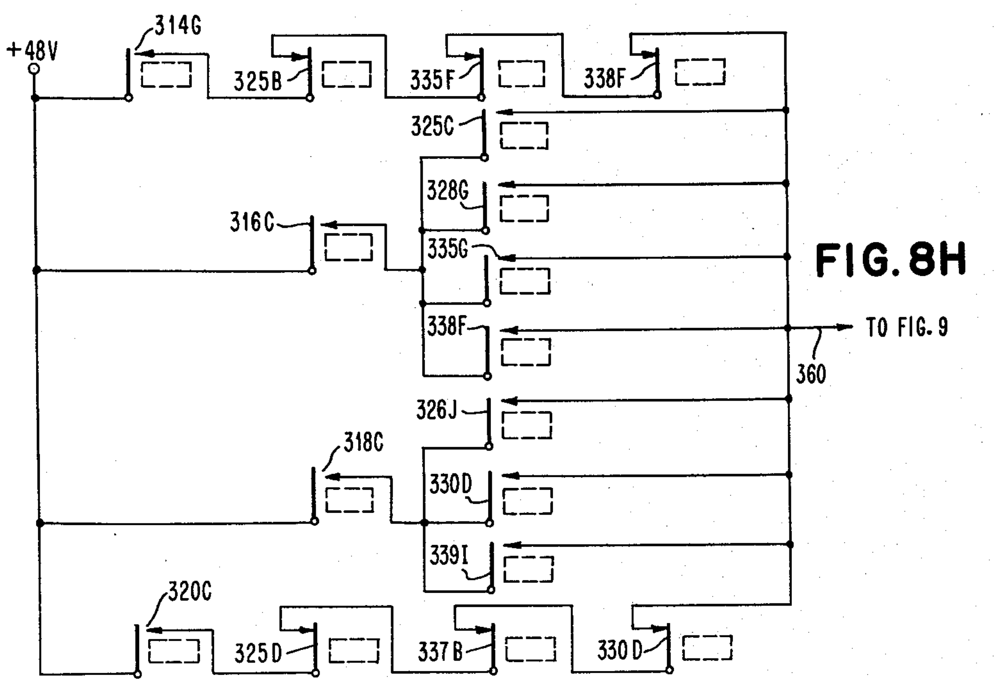
Figure 8I:
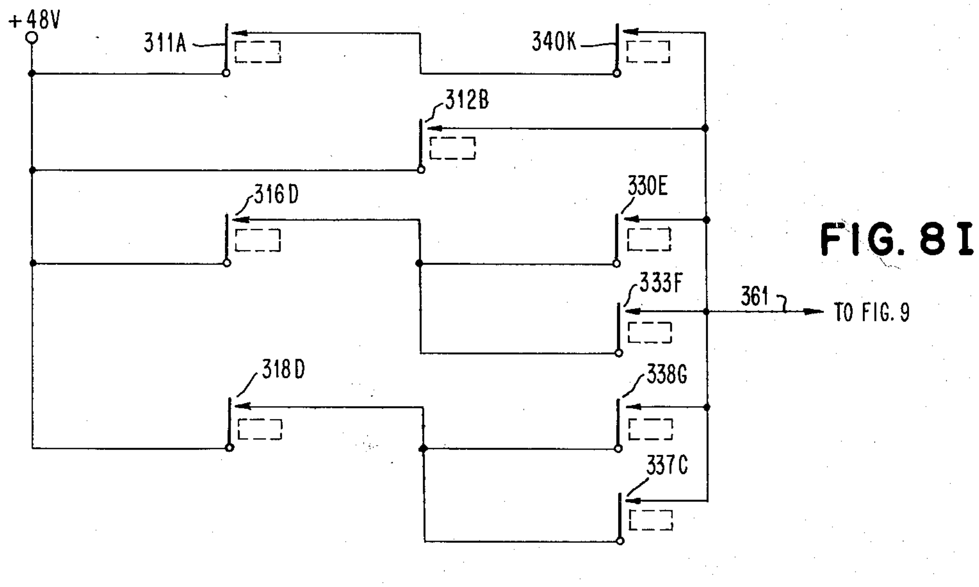
Figure 8J:
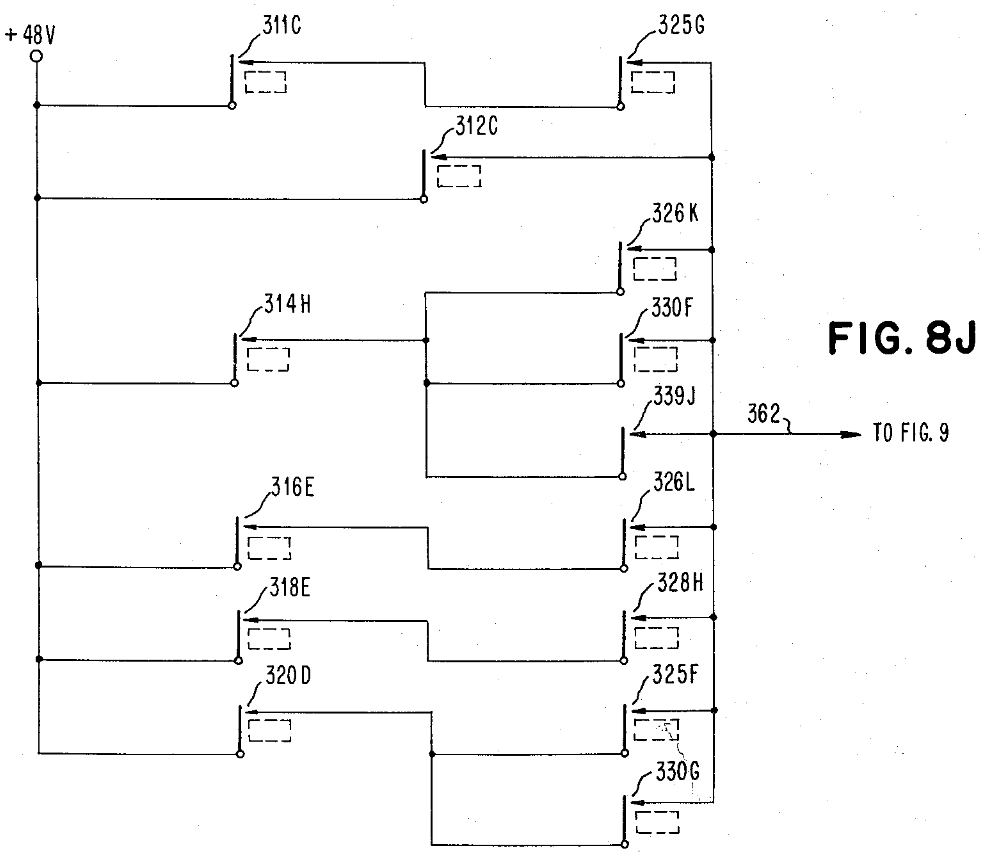
Figure 8K:
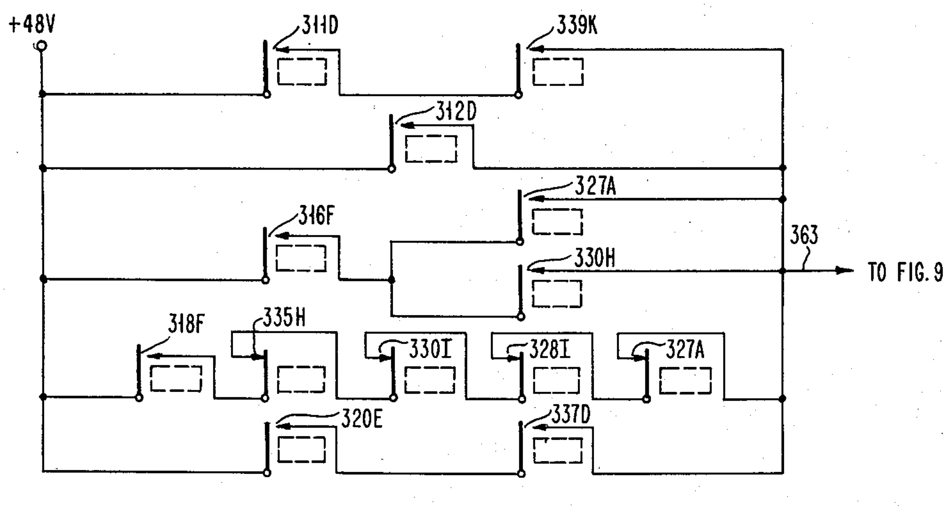
Figure 8L:
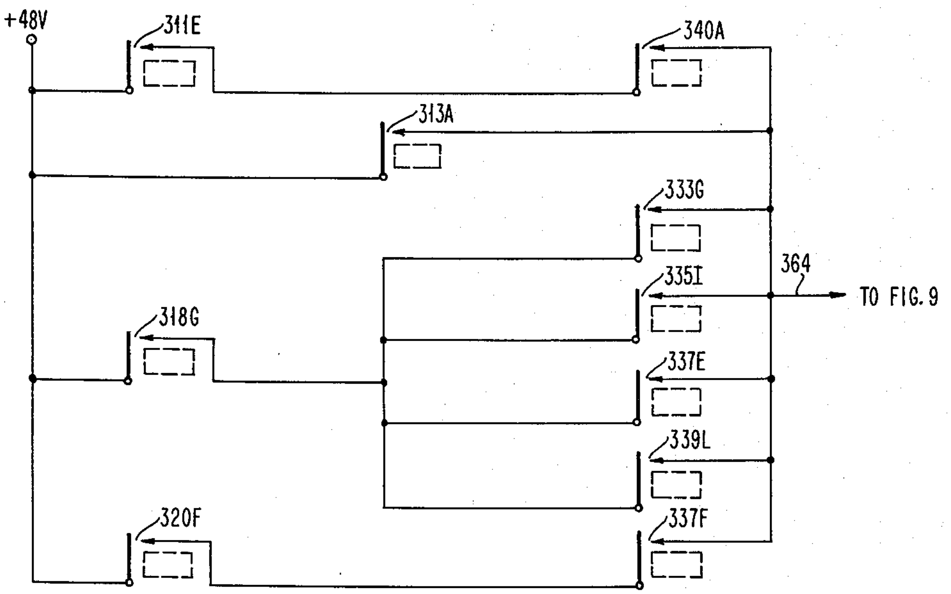
Figure 8M:
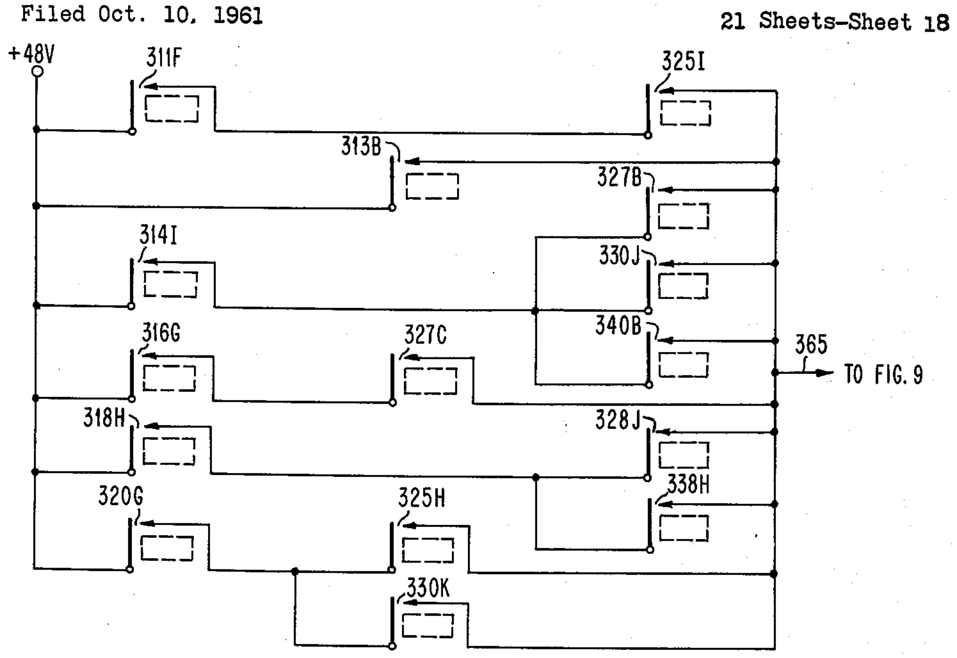
Figure 8N:
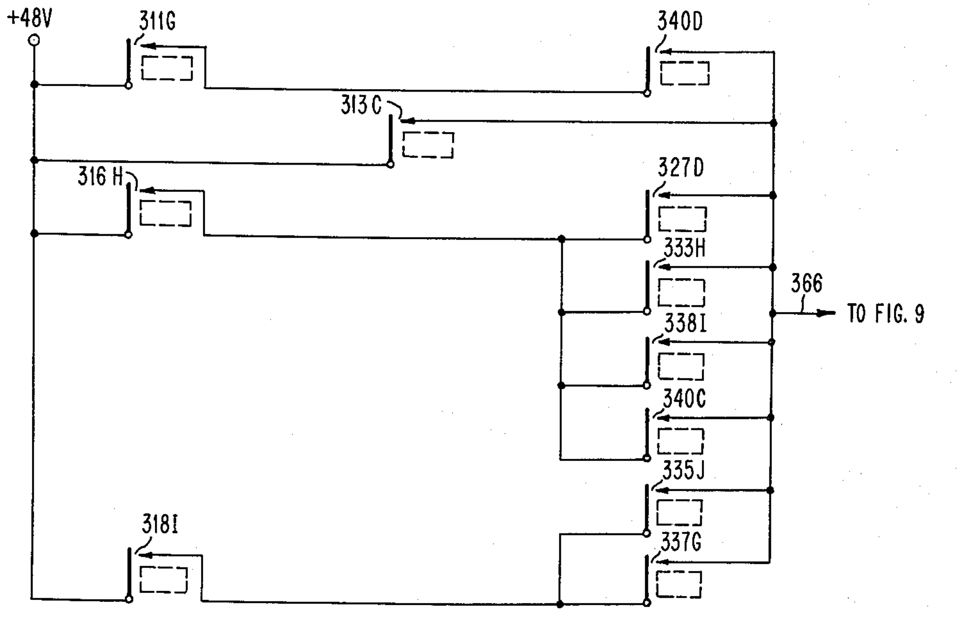
Figure 8O:
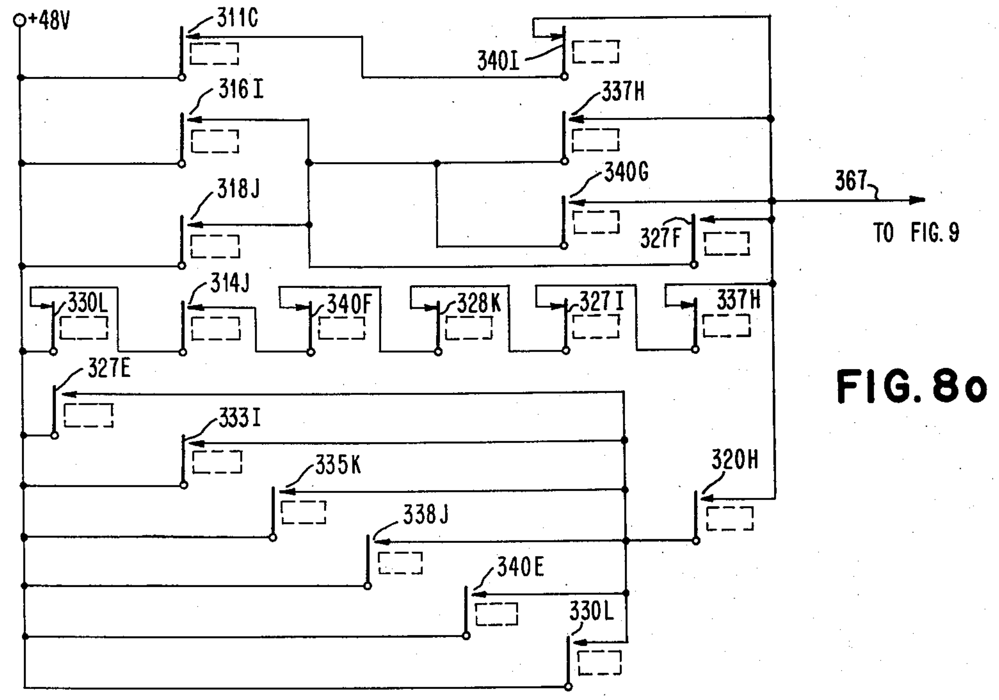
Figure 8P:
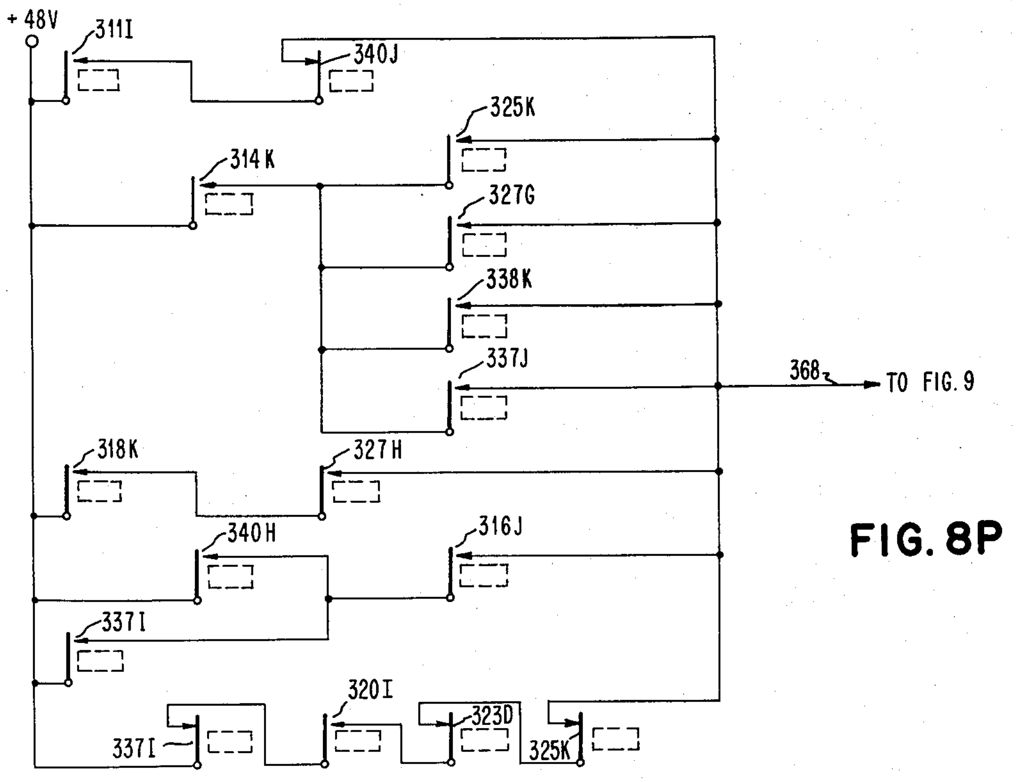
Figure 9:
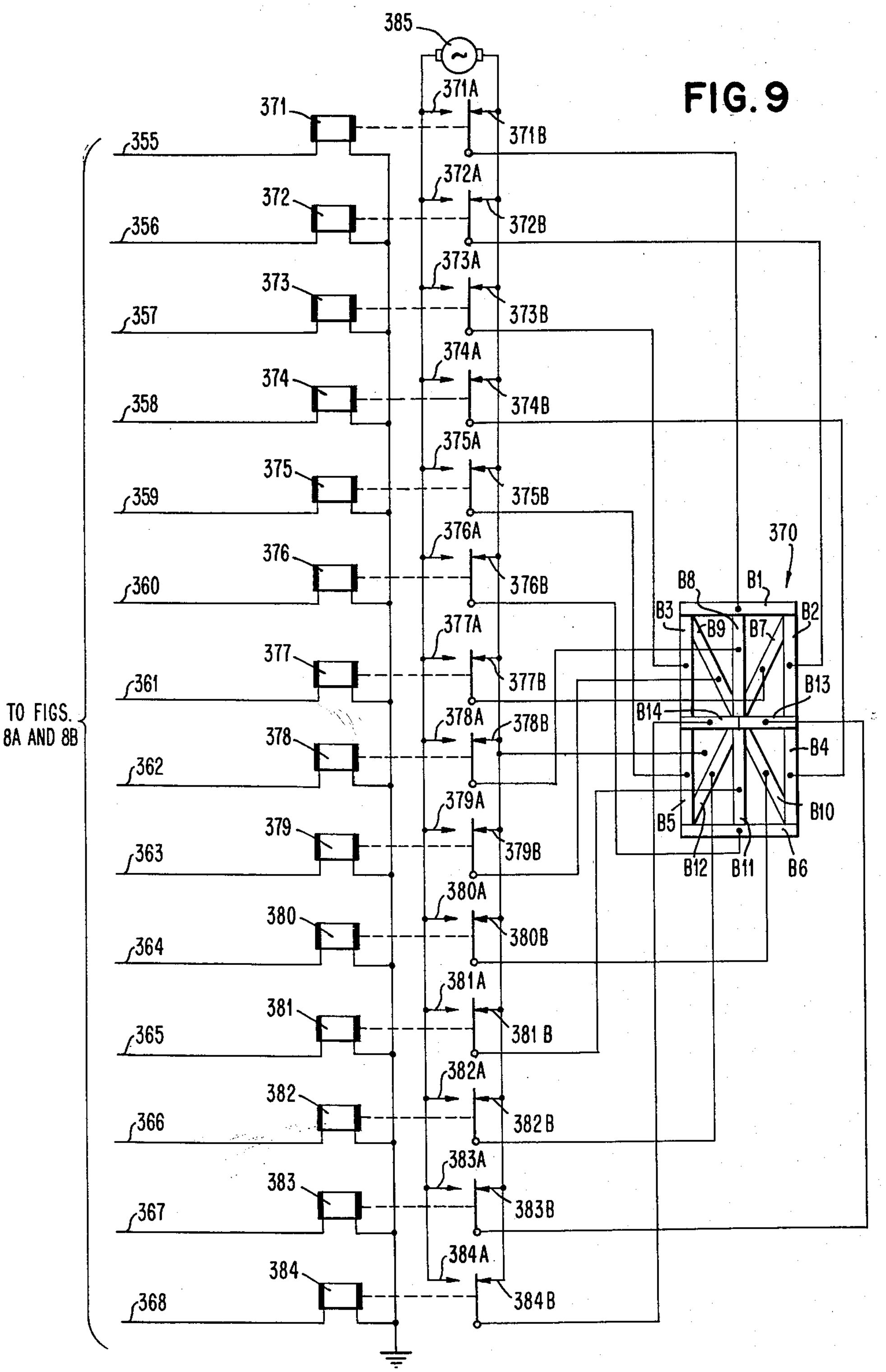
Figure 10:
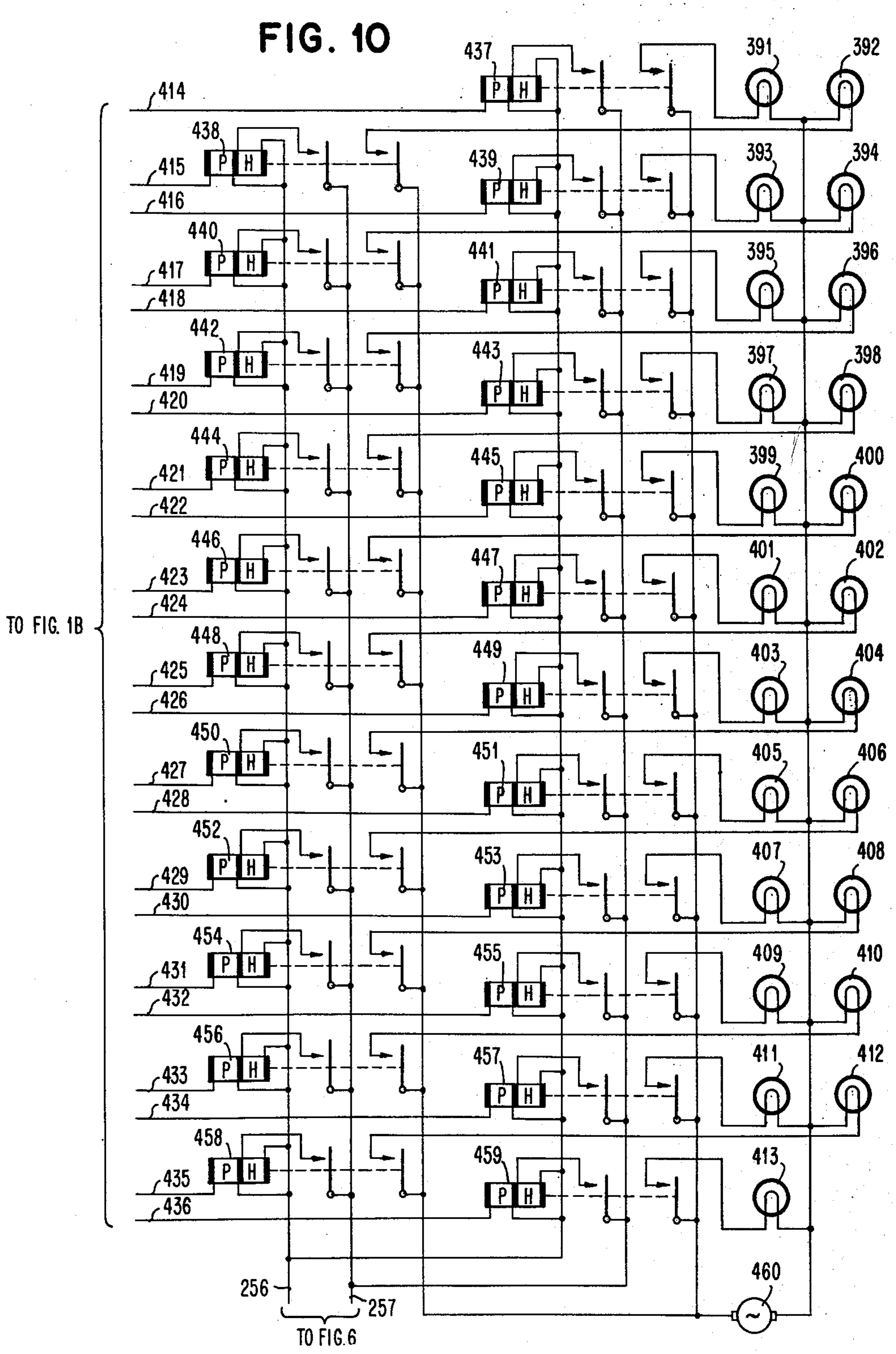

FIGS. 5A and 5B form a detailed schematic diagram of the input control circuit of the apparatus of FIGS. 1A, 1B, and 1C;

FIG. 6 is a detailed schematic diagram of the output control circuit of the apparatus of FIGS. 1A, 1B, and 1C;

FIG. 7 is a detailed schematic diagram of the output digit emitter circuits employed in the apparatus of FIGS. 1A, 1B, and 1C;

FIGS. 8A through 8P are schematic diagrams which illustrate and explain a typical decimal to binary converter employed in the apparatus of FIGS. 1A, 1B, and 1C;

FIG. 9 is a schematic diagram of a typical display device and associated circuits employed in the apparatus of FIGS. 1A, 1B, and 1C; and FIG. 10 is a schematic diagram of the cue lamp circuitry employed in the apparatus of FIGS. 1A, 1B, and 1C.

Before proceeding with a detailed explanation of the drawings of the embodiments of the educational apparatus for the teaching of stenotypy, a brief discussion of the fundamentals of stenotypy and the necessity for the stenotypist to simultaneously learn both a mental concept and a psycho-motor skill is presented hereinbelow.

Stenotypy is a system of recording speech in plain English letters by means of a machine called the stenotype. The stenotype machine includes a keyboard which is divided into three natural groups of letters as illustrated in the drawings. Beginning at the left, the first four pairs of keys compose a group known as initial consonants. These are the keys used to begin words. The group of four keys in the middle of the keyboard and a little below the other keys are the vowels which may be combined to form diphthongs, that is, a combination of vowels as in "out." Beginning at the right of the keyboard the first five pairs of keys compose the group known as final consonants. These are the keys used to end words. The keys of the stenotype always strike in the same position on the paper, the initial consonants at the left on the tape, the vowels in the center, and the final consonants at the right. The upper letter of each pair of keys prints just to the left of the lower one. This enables the writer to strike any or all of the keys at one time so that a word or a phrase containing several words may be written at each stroke. When the keys are struck, the characters are printed on a strip of paper which automatically feeds forward for a new line. The stenotype keyboard is composed of 23 keys, and does not have keys for all the alphabet letters. Letters not on the keyboard are formed by a combination of certain ones of the keyboard letters. For example, the vowel "i" does not appear. It is represented by "EU" struck together. Initial consonants and final consonants are also distinguished. Final consonants will hereinafter be designated in this discussion as being preceded by a hyphen, such as -ch, as in "each" and "rich." The initial consonant of the combination ch, is designated without a hyphen, such as ch in "chain" and "chair." Final consonants are composed of keyboard letters from the right side of the keyboard, for example, the final consonant -ch as it appears in "each" or "rich" is composed of the keyboard combination FP, whereas when ch is an initial consonant as it appears in "chain" or "chair" it is composed of keyboard combination KH, which is located on the left side of the keyboard.

The stenotypy student must not only acquire the necessary motor-skill to enable him to manually operate the stenotype keyboard quickly and accurately, but he must also acquire the standard stenotype code in order to understand what he has recorded. A few examples of the letter combinations used in the stenotype code to overcome the fact that the keyboard has only twenty-three keys and to enable the operator to record phonetic sounds is shown below:

EU for i and vowel y
-F for -v
PH for m
-FP for -ch, as in "each," "rich," etc.
-RB for -sh, as in "wash," "push," etc.
-PB for -n
TK for d
KW for qu, as in "queen," "quick," etc.
KH for ch, as in "chain," "chair," etc.
TPH for n
TKPW for g
-PL for -m
BG for -k
-PBG for -nk, -ng, -nj
-PBLG for -j and soft -g
S for s, z, and soft c
SKWR for j and soft g
-S for -s, -z, and soft -c
-BGS for -x
-G for -ing and for -thing in compound words
-B for -body in compound words as in "everybody"
-PLT for -ment, as in "ailment"

It is seen from the above list that many conventional English words will appear quite different when recorded on the stenotypy machine. For example, the word "munition" will appear PHUPBGS, "duration" will appear TKURGS, "function" will appear TPUPBGS, and "election" will appear HREGBS. Unless the stenotype operator is familiar with the stenotypy code as shown above, he will be unable to transcribe his notes after dictation; therefore, it is equally important that the stenotypy student learn the mental concept of stenotype code as well as the motor reflex required to operate the stenotype keyboard.

In operating the stenotypy keyboard, the action of the experienced operator is basically one of motor-skill, and he is not consciously translating each section of dictated material into the stenotypy code. After recording the dictated material on the stenotype tape, the student must be well acquainted with the code in order to transcribe his notes into written English. Therefore, the value of the present invention is that it teaches the student the stenotype code at the same time that he is acquiring the motor-skills to operate the stenotype keyboard.

The stenotype teaching machine is composed of three major units. The first major unit is the input stage 1 shown in FIG. 1A, which includes the student console 4, the keyboard 5, and associated control circuitry. The second major unit is the computing stage 2 shown in FIG. 1B, which processes the input information and includes a memory and a logical decision unit. The third major unit is the output stage 3 shown in FIG. 1C, which may include a visual display system or an audio output system.

In the input stage the student console 2 contains four manually operated switches 6 through 9 and six display lamps, four of which are associated with the manual switches and merely indicate the switch has been activated. The four manual switches 6 through 9 permit the student to enter certain standard stereotype statements to the machine. For example, switch 6 is the "I am ready" switch, which tells the machine that the student is now ready to begin his practice. Switch 7 is the "I would like to stop" switch, which tells the machine that the student would like to finish or to end for the day. Switch 8 is the "next line please" switch, which tells the machine that the student has received a line of output information displayed or recited to him and is ready for the next line. The "please prompt me" switch 9 is used by the student to indicate to the machine that he would like to have some information or additional help on a particular problem.

Each of the four manual switches 6 through 9 discussed has an associated lamp which is visible through the front of the console for the purpose of indicating to the student which switch he has closed. Two other display lamps 10 and 11 are provided which are visible through the front of the console. These are use to convey stereotype statements to the student from the machine. Display lamp 10 instructs the student to "read your text," and display lamp 11 indicates at the end of the lesson that "that's all for today." Another set of switches in the student console are the two dials 12 and 13, which the student uses to indicate his name, in the form of a code number, to the computing stage 2. Switches 12 and 13 may be rotary switches manually operated through the front of the console 4. The input stage 1 also contains the keyboard 5. This is a standard stenotype keyboard modified with a special set of electrical contacts attached to each key. As each key is pushed, the standard stenotype machine prints out the characters on paper tape in the usual manner while the electrical contacts activate associated ones of a set of 23 relays in relay circuit 14, one for each key. Another function that the contacts and relays perform is storage, that is, information from the keyboard 5 will not be entered into the computing stage 2 until all the keys have been released. For example, to enter a three key press word, the student would simultaneously or nearly simultaneously push down all three keys. As soon as all of them have been released, information can then be entered from the keyboard 5 into the memory portion of the computing stage 2.

The input stage 1 also includes control circuitry associated with the student console. The control circuitry includes the input control circuit 15 and the input digit emitters 16. The input control circuti 15 is basically a system of relays which control the sequence of operation in the transmission of information from the keyboard 5 and student console 4 to the computing stage 2. The input digit emitters 16 are one of two sets of emitters, the other set being the output digit emitters in the output stage, which cooperate with the input to and the output from the computing stage 2, respectively. The input digit emitters are necessary for the conversion of the coded signals from the input stage into a form acceptable by computing stage 2, which is in the present example the biquinary code. The output signals from the input digit emitters 16, which may include the twenty-three keyboard signals from keyboard 5 and the four standard statements and the two student code signals from the student console 4, are transmitted to computing stage 2, and more specifically to the input buffer thereof.

The second major unit of the stenotype teaching machine is the computing stage 2. The computing stage 2 includes a modifiable general memory storage means 17, which includes a memory means 18 for retaining the subject matter of the stenotype course, that is, the characters and words which are presented to the student as problem exercises. Memory means 18 is referred to as the main dictionary. General memory storage means 17 also includes memory means 19 for retaining the student's identification and performance record, referred to as the student's record retention means, memory means 20 for retaining the items which the student has answered incorrectly, also referred to as the error dictionary, memory means 21 which includes a clock circuit for retaining the student's response time, memory means 22 for retaining certain standard reinforcing and motivating information such as "read your text," and memory means 23 for retaining decision rules which determine the order of information presentation, also referred to as the program storage.

The computing stage further includes a logical means 24, which cooperates with the general memory storage means 17. Logical means 24 includes a selection means 25 for serially extracting and retaining information from one or more of the retention means within the general memory storage means 17, a selection control means 26, which alters the serial operation of selection means 25 when random selection of stored material is required; for example, on the basis of student response. Logical means 24 further includes an evaluation means 27 which evaluates student response and stores in the general memory storage means correctness information in means 19, error information in means 20, and response time information in means 21, and evaluation means 27 further including means for selecting and receiving for student presentation (through the output stage) student records from means 19 and reinforcing and motivating information from means 22.

An input buffer storage unit 28 is located between the input stage and the memory and the arithmetic units for storing input information to be processed by the computing stage. The input buffer storage unit is required only because the speed of operation of the computing stage is greater than that of the input stage. Likewise, an output buffer storage unit 29 is provided for storing the output signals from the computing stage until they can be accepted by the output stage.

The functions performed by the computing stage 2 as set forth hereinabove may be carried out by means of a general purpose computer having a modifiable memory storage and an arithmetic unit. The various retention means set forth above may be portions of a memory drum, memory cores, or disc storages. The general purpose computer may be programmed to carry out the logical operations required in the present invention in response to input information from input stage 1, and the processed information from the general purpose computer may be applied to output stage 3 in accordance with the overall mode of operation of the present invention.

An example of a general purpose computer capable of performing the functional operations set forth for computing stage 2 is described in U.S. Patent No. 2,959,351, to F. E. Hamilton et al. issued November 8, 1960.

The third major unit of the stenotype teaching machine is the output stage. The output stage 3 shown in FIG. 1C, includes a display panel 30 for presenting visual information to the student. The display panel 30 includes a plurality of alpha-numeric display devices 31 arranged to provide a display of written words, numerals and the like. Each alpha-numeric display device is an electroluminescent unit capable, depending on its input signal, of forming any alphabetic character from A to Z and any numeral from 0 through 9. Display devices 31 require an associated relay circuit 32. The alpha-numeric display devices are used to present the problem exercises and the reinforcing and motivating information to the student. The display panel 30 further includes a plurality of cue lamps 33 and their associated relays 34. The cue lamps 33 are arranged to correspond to the location of the individual keys of the stenotype keyboard 5. The cue lamps are located behind a replica of the stenotype keyboard on the front of the display panel as shown in FIG. 1C. The replica of the keyboard presents the outline of each key with the corresponding keyboard letter within. In operation a problem exercise in the form of a word is presented to the student through the alpha-numeric display devices 31. At the same time the correct keys which are depressed to type the problem word are illuminated on the replica 33 so the student will become familiar with the finger position for typing the word. The student also becomes familiar with the keyboard letters which represent the word and thereby learns the stenotype code.

In addition to the display panel 30, the output stage 3 includes a 2 digit decimal to 14 bit binary converter 35, which converts the "word" signals from the output buffer 29, which are in the form of two time spaced decimal pulses representative of a letter or numeral, into a corresponding representation in a 14 bit binary code. Output control circuitry is provided including the output control circuit 36 and the output digit emitters 37. The output control circuit 36 governs the sequence of transmission of information from the computing stage to the output stage while the output digit emitters are necessary for the conversion of the computing stage code, i.e. biquinary, to the decimal code utilized in the output stage.

As an alternative embodiment to the visual mode of problem presentation through display devices 31, an audio system may be employed. The binary information signal conducted to the display relay circuit 32 may be switched via ganged switches 38 to a binary address selection circuit 39. The binary address selection circuit 39 will, on the basis of the binary information signals from converters 35, select from random access audio memory 40 the recorded audio information that corresponds to the binary signal information. When the required audio information is brought from the memory storage, it is transmitted to the student via speaker 41. The audio information will be the same as the visual information, that is, it will include problem exercises of either letters or words, or standard reinforcing and motivating statements, all of which have been stored in the audio memory 40.

Before describing the detailed circuits included in the aforementioned component parts of the stenotype teaching machine, a discussion of the typical mode of operation of the apparatus and the interrelation of the component parts will now follow.

When the student is ready to begin operation of the apparatus, the keyboard 5 will be inactive and at the student's console 4 the "I would like to stop" lamp will be activated from the end of the previous session. Display panel 30 will be blank, or if the audio mode is used, it will be quiet. The student first dials in his code number through switches 12 and 13 and pushes the "I am ready" switch 6. The student code is then transmitted to student record retention means 19 of general memory storage means 17. In the computing stage 2, it is determined whether the student registered for the course by comparing the code number with "registered" code numbers in the memory 18. If the student has registered for the course, the computing stage proceeds to find out, under the control of logical means 24, if he's a new student by going to the student record memory 19 to determine his status. If the student was not registered for the course a standard statement from retention means 22 is selected and presented by means of display panel 30 to inform the student he is using an invalid number and should check his number and try again. If the student is a new student, the selection means 25 selects the introductory routine, that is, the contents of the main dictionary 18 will be presented through the output stage in serial fashion in cooperation with a textbook. As many instructions and explanatory material may be too extensive or complicated to present to the student through the display panel, a textbook may be provided for this purpose and the "read your text" lamp 10 be utilized to cue the student to use the textbook. The computing stage will determine from the student's stored record in means 19 whether or not he has committed too great a number of errors in previous exercises. If the previous errors exceed a certain amount, the selection control means 26 alters the serial selection means 25 so as to assemble an exercise comprised only of review in error items. The search for the number of errors made by the student, is made by referring to the student record memory 19 under the control of evaluation means 27. In the event that the student record indicates that he has previously incurred less than a certain amount of errors, the evaluation selection means 27A will assemble a new exercise composed of some words which were in error and new words in a proportion determined by the student's record.

When it is determined that the student will be given new problem exercises from a new lesson, the student is directed by means of lamp 10 in student console 4 to "read your text" under a command obtained from student reinforcing and motivating information retention means 22. When the student has completed reading his text he activates the "I am ready" switch 6 on the student's console 4. Selection means 25 will now obtain from the main dictionary 18 the problem exercises for the lesson and transmit the information to the output stage 3 where it will be presented by the display panel 30. The sequence of the problem presentation is generally as follows. The problem is displayed on the display panel 30. The first time the problem is presented, the word will appear on the electroluminescent display devices 31 and the appropriate keys (cue lights) on the keyboard replica 33 will be illuminated. This information is obtained from the main dictionary 18 by selection means 25 under the control of the program in retention means 23. When the student reads the problem, he reacts by pushing the appropriate keys on the keyboard 5 and the information signals from the keyboard are transferred back in through the input buffer storage 28 into evaluation means 27 where, under the control of the stored program 23, the answer is evaluated by comparison with the problem word from the main dictionary 18. If the answer is correct, the sequence will be repeated with the exception that the cue lamps 33 will not be illuminated, but if the answer is incorrect, the sequence will be repeated with the cue lamps illuminated exactly as before to provide additional training.

To briefly summarize the steps of the problem presentations, the first time a problem is presented to the student, it is presented with a cue. If a correct answer is given the problem is repeated without the cue. If the answer is again correct the next problem is presented, but if the second answer is incorrect the problem is again presented with the cue after which the next problem regardless of whether the answer was correct or incorrect is presented. If an incorrect answer was given when the problem was first presented it is repeated with the cue, and if a second incorrect answer is given it is again repeated with the cue, after which the next problem is presented regardless of the answer. Whenever an answer is incorrect, or whenever the student requests a cue by activating the "please prompt me" switch, the evaluation means 27 tabulates this problem as an error and stores in the error dictionary 20 the addresses of all those problems which have been answered incorrectly once, twice, three, four, or five or more times. The evaluation means 27 also tabulates and addresses the problems answered correctly so they may be eliminated from future courses presented to that student.

After a predetermined number of problems have been presented, a statement from the reinforcing and motivating retention means 22 will appear on the display panel 30 informing the student that an "exercise" has been completed and that if he would like to continue he should activate the "next line please" switch 8, or if not, to activate the "I would like to stop" switch 7. If the student wishes to continue, the selection means 25 under the control of the selection control means 26 and the program retention means 23 assembles a new exercise from problems in the main dictionary 18 and the error dictionary 20. At the completion of each exercise evaluation means 27 through selection control means 26 and selection means 25 will assemble a group of problems for the purpose of testing the student. The cue lights 33 are not used during the test, and the student's performance is stored in student record retention means 19. The performance of the student in the test will determine whether a new exercise is to be given, and the degree of complexity of the problems in the new exercise.

Another important factor in the determination of whether the student will be given a new exercise is the indicated reaction time of the student. Factors such as the rate of keyboard operation will also determine whether the student will be given a new exercise or whether the same exercise will be repeated until the student's speed increases.

A discussion of the specific circuits of the components shown in FIGS. 1A, 1B, and 1C is presented hereinbelow to illustrate how the functions that are performed in the overall system operation are carried out. The first stage discussed will be the input stage 1 including keyboard 5 and keyboard relay circuit 14, student's control console 4, input control circuit 15, and input digit emitters 16.

*Keyboard Circuitry*

Figure 2:
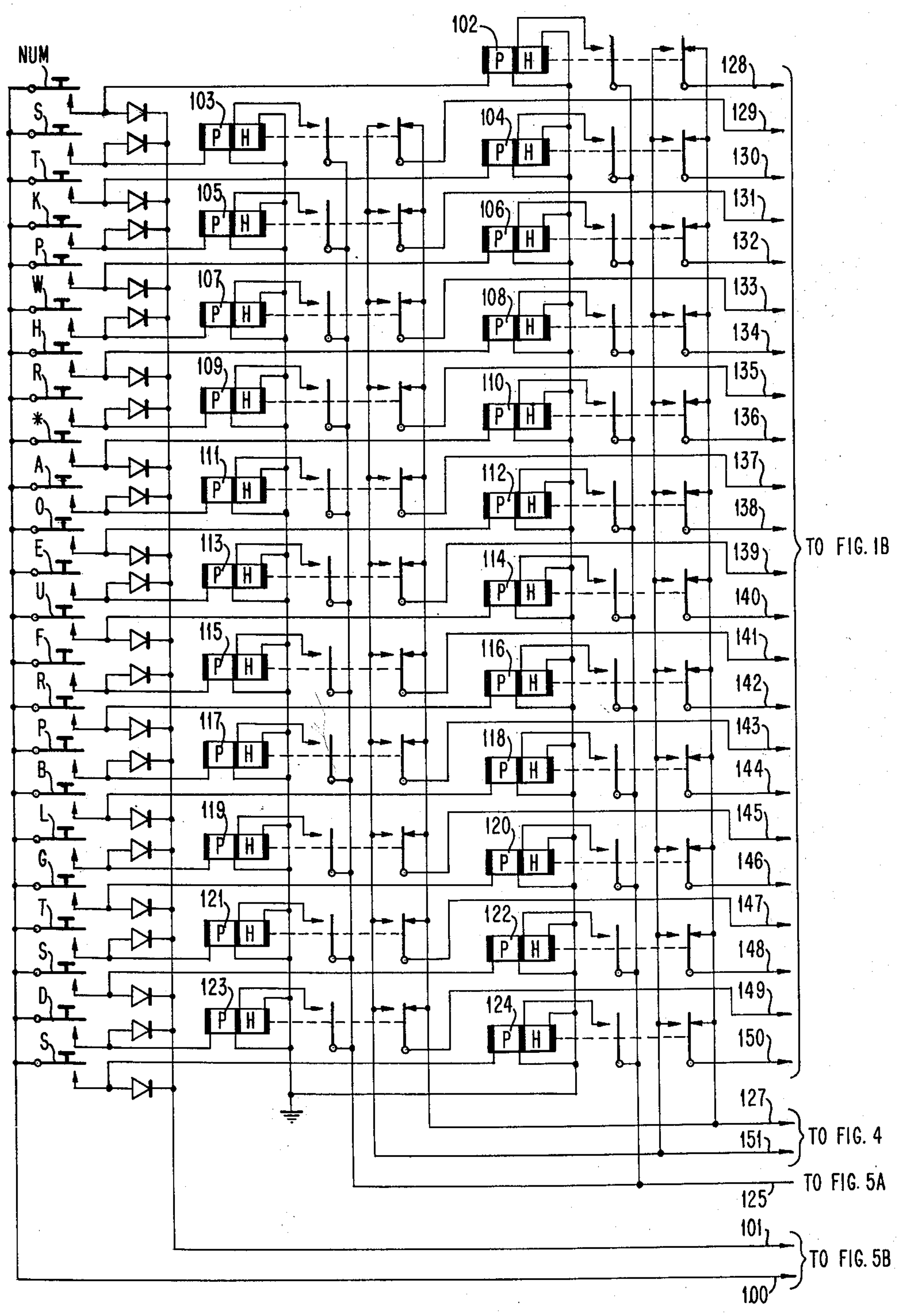
FIG. 2 is a detailed schematic diagram of the keyboard circuitry of the educational apparatus of FIGS. 1A, 1B, and 1C.

FIG. 2 is a schematic representation of the detailed circuitry of the stenotype keyboard and the associated relays which are used as a temporary storage medium for the information received from the keyboard as the keys are depressed. The twenty-three manually operated switches such as are designated S, T, K, P, W, etc. are mechanically connected to the individual keys of the stenotype keyboard corresponding to the designated letters. A +48 volt supply is coupled to one end of the switches by lead 100 and the other ends of the switches are connected through a series of twenty-three diodes to lead 101. When the student depresses selected keys on the stenotype keyboard, the associated manual switches S, T, K, P, etc. are closed thereby making an electrical circuit which energizes corresponding ones of the twenty-three relays 102 through 124. As the corresponding relays 102 through 124 are energized, the normally open contacts associated with each relay are closed. The energized ones of relays 102 through 124 are held closed by means of their holding coils energized by a signal on lead 125. As the manual switches are closed a +48 volt signal is conducted through the associated diodes and is placed on lead 101, which energizes relay 190 in the input control circuit shown in FIG. 5B. After typing in the information, the student releases the keyboard keys thereby opening manual switches S, T, K, P, etc. When the student releases the last key, the +48 volt signal is no longer present on lead 101 and relay 190 in the input control circuit FIG. 5B is de-energized. When the input digit emitters in FIG. 4 cycles to digit "8" (to be later explained) the digit "8" pulse is transmitted via lead 127 to the normally closed contacts of relays 102 to 124. For the particular relays 102 through 124 which are not energized (i.e., the associated key was not depressed) the "8" digit pulse will go through the normally closed contact of the relay to the armature and to the associated output line of the output lines labeled 128 through 150. For the relays which are energized, nothing will happen at this time. However, after the occurrence of digit "8," the input digit emitters in FIG. 4 produce a digit "9." Digit "9" appears on lead 151 and is directed to the normally open contacts of all the relays 102 to 124. If any of the relays are energized this time, the signal will go through the normally open, but now closed, contact through the armature and out the associated ones of output lines 128 to 150 as before. Thus, the signals on the output leads 128 to 150 will be either binary digit "8" or "9." A binary digit "9" indicates that a given key has been depressed, while a binary digit "8" indicates the key was not depressed. These output signals are fed to the computing stage 2 (FIG. 1B) where they are stored in the input buffer storage 28. Also, while the input digit emitter 16 (FIG. 4) is cycling through the "8" and "9" digits, the signal is removed from lead 100 so that if any keys are depressed at this time, they will not energize the relays. After input digit "9" time, the signal at 125 is removed by relay 184 (FIG. 5A) energizing briefly. This de-energizes all the relays 102 through 124 and resets the keyboard circuit for the next depression of the keyboard.

*Student's Control Console*

Figure 3:
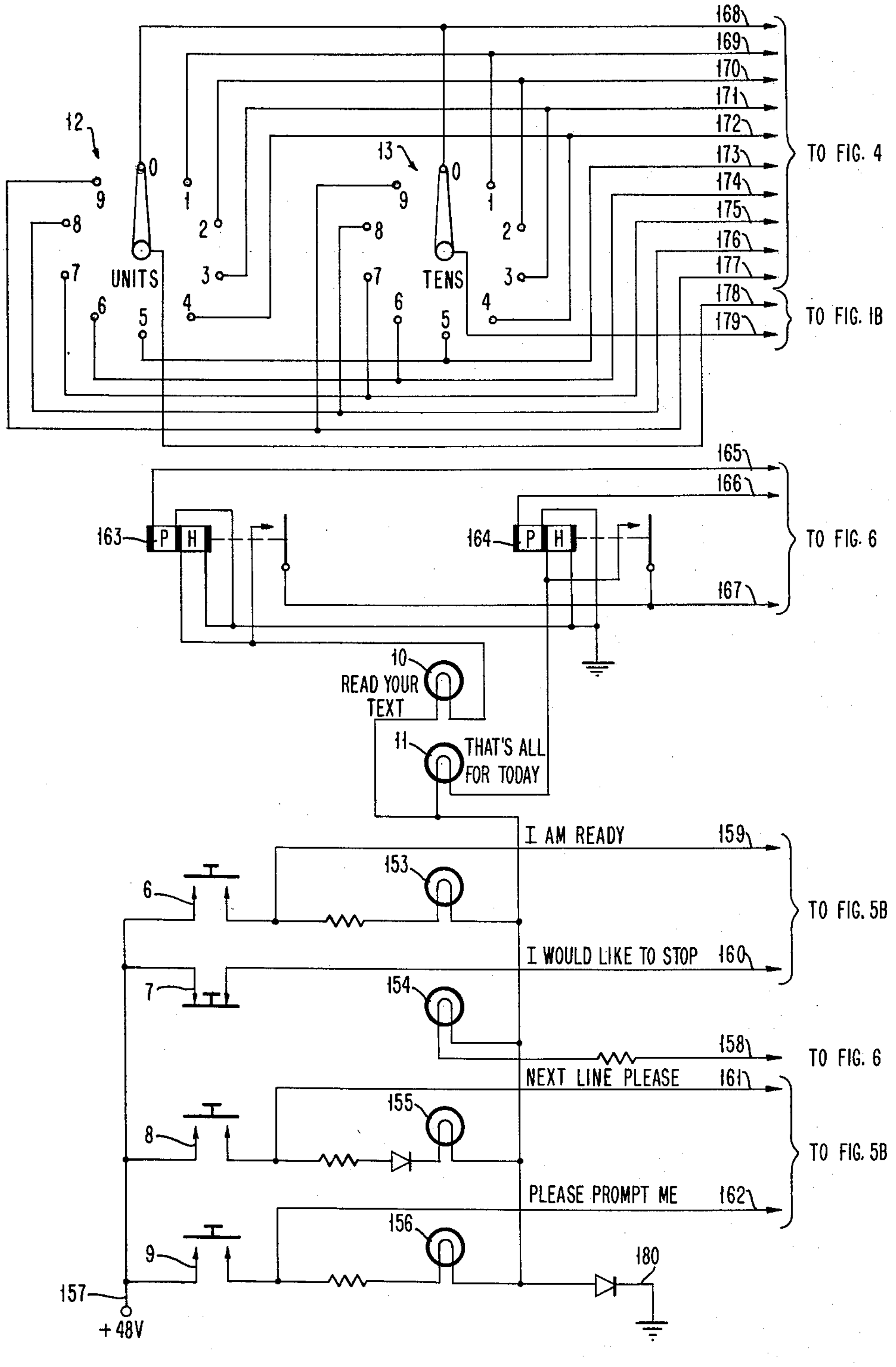
FIG. 3 is a detailed schematic diagram of the student's control console circuitry of the educational apparatus of FIGS. 1A, 1B, and 1C.

The student's control console 4 shown in detail in FIG. 3 includes a student code input, which is basically two manually operated ten position rotary switches 12 and 13, each having ten switch positions. Switch 13 is a "tens" switch and switch 12 is a "units" switch. The function of the student code switches is merely to provide a means for student identification. Each student is given a different two number identifying combination for identifying himself, for example, a particular student may be identified as 63, in which case he would set the "units" switch to 3 and the "tens" switch to 6 at the beginning of the course. These identifying code signals are transmitted from output leads 168 through 179 through the input digit emitter in FIG. 4 to the computing stage 2 so that it may be determined whether the student is new or has had previous experience, and to enable a record of performance to be maintained under each student's name. The student control console also includes four manually operated switches 6, 7, 8, and 9 mechanically connected to push buttons located on the face of the console. The four switches 6 through 9 permit the student to enter commands which are, respectively, "I am ready," "I would like to stop," "next line please," and "please prompt me." Each of the four manually operated switches has an associated indicator lamp, 153, 154, 155, and 156, which can be seen on the face of the console. A +48 volt supply is connected to one end of the manually operated switches through lead 157. When a given one of switches 6 through 9 is operated, an electrical circuit is completed which will illuminate the associated lamp, the ground lead for each lamp is connected to reference potential through lead 180. When the "I am ready" switch 6 is closed an electrical circuit is made and a signal leaves lead 159. When switch 7 is closed the "I would like to stop" signal leaves lead 160. Likewise, the "next line please" signal leaves lead 161 and the "please prompt me" signal leaves lead 162. Leads 159, 160, 161, and 162 are coupled to the input control circuit (FIG. 5B). The "read your text" lamp 10 and the "that's all for today" lamp 11 are two instruction lamps located on the face of the console and are illuminated in response from a signal from the computing stage 4 based on the program address. At certain points in the progress of the stenotype course, it is necessary for the student to consult a written manual. This instruction is given by means of the "read your text" lamp 10 at times specified by the stored program in the memory. At the completion of the course, the "that's all for today" lamp 11 will tell the student that a predetermined portion of the course has been completed, this command also being determined by a signal from the program. The signals determined by the computing stage for the "read your text" lamp 10 and the "that's all for today" lamp 11 are applied to relays 163 and 164 through leads 165 and 166 from the output control buffer circuit 36. Lead 167 is also connected to the output control circuit (FIG. 5B) to obtain the holding signal for relays 163 and 164. Since the "I would like to stop" lamp 154 is not dependent on the operation cycle of the machine, that is, it remains lighted after the exercise sequence is completed, a separate source of illumination signal is supplied via lead 158 from relay 181 in the input control circuit of FIG. 5B. Light 154 is extinguished by the closing of the "I am ready" switch 6 (which also opens switch 7).

*Input Control and Emitter Circuits*

The input control circuit in FIGS. 5A and 5B includes relays 181 through 191 and circuit breakers 192 through 197. The purpose of the input control circuitry is to control the flow of information from keyboard 5 and student's console 4 to computing stage 2. Basically the input control circuitry has two modes of operation, one utilizes keyboard and the other does not. In the keyboard mode, the sequence of operation is as follows. Relay 187 is energized by a signal on lead 159 produced when the "I am ready" switch is closed. Relay 187 is maintained energized through contact 187A normally open, contact 163A normally closed, and contact 164A in the student console (FIG. 3) normally closed and the normally closed push switch 7, "I would like to stop." Prior to the control circuit cycles, and due to the prior cycle, relay 191 is energized and held through contact 191A, normally open and contact 187B, normally open. The sequence then proceeds as follows. First, input circuit breaker 193 closes applying +70 volts to relay 182, however, the other side of relay 182 is coupled through lead 198 to an open circuit condition on the computing stage. Circuit breaker 192 closes, applying +150 volts on lead 198. This provides a signal to the computing stage 2 to close the open circuit condition in relay 182. Relay 182 is then energized through circuit breaker 193 and a +70 volt signal from the computing stage. Relay 185 is energized through contact 182A, normally open and is held through contact 185A, normally open and contact 183A, normally closed. Circuit breaker 192 opens and relay 182 becomes de-energized. A +48 volt signal is applied to the keyboard contacts S, T, K, P, etc. through lead 100. The keyboard is then in condition for the student to make his reply by depressing the keys. When the first key is depressed, relay 190 is energized through lead 101. Relay 186 is energized through contact 190A, normally open and is held through contact 186A, normally open and contact 184A, normally closed. When the last key is released, relay 190 is de-energized for the reasons set forth in the discussion of the keyboard circuit, and a +48 volt signal is applied through circuit breaker 195 through contact 190B, normally closed and contact 186B, normally open. When circuit breaker 195 closes, relay 184 is energized and is held through contact 184B, normally open and contact 183B, normally closed. Relay 186 is de-energized through contact 184A, normally closed.

Figure 4:
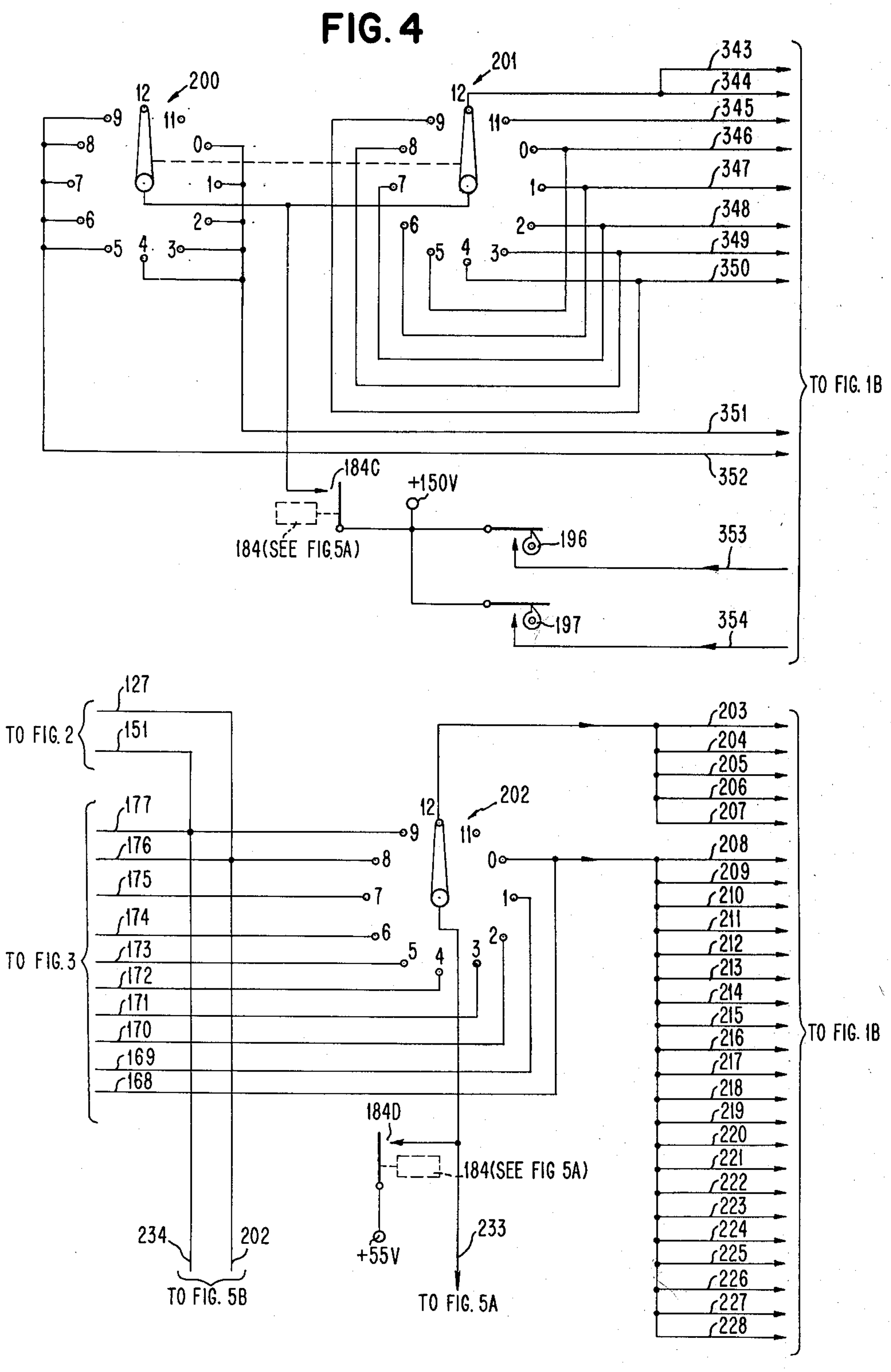
FIG. 4 is a detailed schematic diagram of the input digit emitter circuits utilized in the apparatus of FIGS. 1A, 1B, and 1C.

Referring to FIG. 4, the input digit emitter circuits are shown. The input digit emitters, as well as the output digit emitters to be later discussed, perform functions similar to the well known read and punch digit emitters used with punched card computers. The input digit emitter circuits include three input digit emitters 200, 201, and 202. The emitters are essentially motor driven rotor arms with twelve contacts over which the rotor arms pass thereby sequentially connecting electrical circuits through leads coupled to the rotor arms and the contacts. Digit emitters 200 and 201 function together and are primarily employed to generate time spaced pulses in discrete time positions which are gated with the information signals from the input stage to enable the computing stage to convert the input stage decimal information into the biquinary code used within the computing stage. Digit emitter 202 also continually cycles and is used to generate keyboard and student console information signals in response to particular relay conditions present in the keyboard and student console. The emitters employed in the present invention are similar in function and construction to those shown in FIG. 48A and described in U.S. Patent No. 2,615,569 to C. D. Lake et al. issued October 28, 1952.

In the sequence of operation of the input digit emitter circuits, a +150 volt signal is applied to input emitters 200 and 201 and circuit breakers 196 and 197 through contact 184C, normally open. A +55 volt signal is applied to input emitter 202 through contact 184D normally open. The contact "12" of digit emitter 3 is coupled directly to leads 203 through 207. The occurrence of a "12" digit pulse from emitter 202 on these leads places a "plus" sign on all words read by the computing stage, and an "11" digit pulse indicates a "minus" sign. All the possible words of the biquinary code are not used in the present invention, therefore a "0" digit pulse from emitters 202 is applied to leads 208 through 228, to place a "0" in the word positions in the computing stage that are not used in the present invention. This also is a known technique in the computer art. Digits 1 through 7 of emitter 202 are used to gate the various switch combinations from the student code switches 11 and 12, in student console 4. "Digit "9" is used to indicate an "on" position, that is, that a keyboard key is depressed or that a student control console switch is closed. A digit "8" is used to indicate an "off" condition such as a key not depressed or a switch not activated. In the discussion of the keyboard circuit of FIG. 2 it was stated that at digit "8" time a signal is passed through the undepressed key circuits to the output circuit while at digit "9" time a signal was passed through the depressed key output circuits to the output lines. The computing stage is then able to determine at digit "8" time which keys were not depressed and at digit "9" time which keys were depressed. The control of digits "8" and "9" and their time of occurrence are now seen to be a function of input digit emitter 202.

The digits "8" and "9" time controlled by input digit emitter 202 also determines whether the switches 6 through 9 in student control console are closed or not. The sequence of operation when the "I am ready" switch 6 is closed is as follows (referring to FIG. 5B). An "on" signal is present at digit "9" time on lead 229 through contact 187C of relay 187 now energized by the "I am ready" signal on lead 159 from the student control console. Prior to this an "off" signal was present on lead 230 at digit "8" time through contact 181A of relay 181 (not energized). Likewise, an "off" signal is present on lead 231 through contact 188A of relay 188 (not energized) and on lead 232 through contact 189A or relay 189 (not energized).

The sequence set forth above related to the condition present when the "I am ready" switch 6 was closed. In a similar manner it can be seen that when the other student console switches 7 through 9 are closed an "off" signal will be present on the open switches associated output leads of leads 229 through 232 at digit "8" time while an "on" signal will be present on the closed switch lead of leads 229 through 232 at digit "9" time. The particular relays energized in each instance will be different, but this can be determined by following the input signal on the one of leads 159 through 162 for the console switch under consideration.

After digit "9" time the information has now been transferred to the computing stage and a reset operation takes place, that is, circuit breaker 194 (FIG. 5A) closes, placing +55 volts on relay 183 thereby energizing it. If relay 188 or 189 were energized they now drop out; the holding voltage on the keyboard relays is removed by the switching of contact 183C; relay 184, which energizes the input emitters 200, 201, and 202 via contacts 184C and 184D, drops out thereby removing the signal from the input emitters and this in turn removes the holding voltage from relay 183 through contact 184B and relay 183 in turn de-energizes.

*Output Control and Smitter Circuits*

The output control circuit shown in FIG. 6 consists basically of relays 241 through 245 and circuit breakers 246 through 253. The purpose of the output control circuitry is to control the flow of information signals from the computing stage 2 to display panel 30. The sequence of circuit operation is as follows. Circuit breaker 250 closes coupling relay 241 to a +70 volt potential source in the computing stage, however, the +70 volt source is in open circuit condition so that relay 241 is not energized. Then circuit breaker 251 closes applying a +150 volt signal to computing stage 2 through lead 254 thereby enabling the +70 volt source to complete a closed circuit. Relay 241 becomes energized closing normally open contact 241A. This places a +48 volt energizing signal on relay 242. Contact 242A closes applying a +150 volt signal to circuit breaker 252 and through lead 255 as a restart signal to computing stage 2. When relay 241 closed it also placed a +48 volt energization signal on relay 243 through contact 241B. Relay 243 is then held by a +48 volt signal through circuit breaker 246 and contact 243A. Circuit breaker 251 now opens and circuit breaker 250 opens dropping out relays 241 and 242. The +48 volt signal for display panel 30 is applied through 245A, normally closed and 245B, normally open. At digit "12" time a signal from the output digit emitters on lead 240 energizes relay 245 and interrupts the +48 volt signal. This resets the display devices 33 in display panel 30. More particularly, leads 258 and 259 from relay 245 are coupled to fourteen converters each of converters 35 to reset the display devices associated with each group of converters. A more complete understanding of the operations of the output control circuit may be had by considering the output digit emitters.

Referring to FIG. 7, the detailed circuitry of the output digit emitters are shown. The output digit emitters are similar in structure and function to the input digit emitters shown in FIG. 4. A +150 volt signal is applied to the output digit emitters 266 and 267 through contact 243B, normally open of relay 243 shown in FIG. 6. A +48 volt signal is applied to output digit emitter 243 through contact 243C, normally open. This contact also applies +48 volts to circuit breaker 269. Output digit emitters 266 and 267 are, similar to input emitters 200 and 201, necessary for the transfer of decimal signals into the biquinary code. Output digit emiter 268 controls the sequence of operation of the two digit decimal to the 14 bit binary converter 35.

The output digit emiters 266 and 267 continuously cycle, that is the wiper arms are continuously rotated past the twelve contacts so that digits 12, 11 and 0 through 9 which represent plus, minus and 0 through 9 digit information are generated. These generated decimal signals are transmitted to the computing stage through leads 270 to 276. A particular digit will be present in the computing stage as a function of the stored program. When coincidence between the stored digit and a generated digit from the emitters occurs, a coincidence condition results permitting an enabling signal from the emitters to generate a particular program in the computing stage. For example, if the "read your text" signal is generated by the computing stage on the basis of a logic decision in the evaluation means, as the emitters 266 and 267 cycle through the "9" position, it enables the "read your text" signal on lead 261 to pass through circuit breaker 247 in the output control circuit shown in FIG. 6. Likewise, if the "that's all for today" signal is generated in the computing stage at "9" digit time the signal on lead 262 will pass through circuit breaker 248 in the output control circuit (FIG. 6). The cue lamps 33 may also be enabled at output emitter "9" time by relay 244 energizing through output circuit breaker 253 and holding through contact 244A, normally open and contact 245A, normally closed. This applies reference potential to the cue lamp circuits 34 through contact 244B, normally open. After the emitter 266 and 267 wiper arms pass the "9" digit contact, circuit breaker 246 opens and relay 243 drops. This removes the +48 volts, +70 volts, +150 volts signals from the output emitter, wiper arms, and from the output circuit breakers. At the start of the next emitter cycle relay 244 is reset by contact 245A, normally closed. During this cycle, the output digits "0" through "9" have been transferred through leads 291 to 300 to the decimal to the binary converter shown in FIG. 8A and FIG. 8B.

*Decimal to Binary Converters*

Referring to FIGS. 8A and 8B, the circuitry for one of the twenty-eight decimal to binary converters is shown. Each of the converters is more particularly a two digit decimal to fourteen bit binary converter and includes thirty-one relays 310 through 340.

The input to the two digit decimal to a fourteen bit binary converter is in the form of two discrete signals on two separate input leads 341 and 342 referred to, respectively, as the "most significant" digit lead and the "least significant" digit lead. The input signals on both leads are outputs from the computing stage in the form of pulses which may occur on a time basis at any one of ten equal time positions from time zero corresponding to the output emitter cycle discussed hereinabove, therefore, the "most significant" digit may be a time pulse in any one of ten positions from time zero. Likewise, the "least significant" digit may be a time pulse in any one of ten time positions from time zero. This provides a total number of pulse time combinations between the two digits from positions 00 to 99 or 100 distinct combinations. Since these signals from the computing stage represent up to 26 alphabetic characters and 10 numeric characters plus a few special punctuation and instructional characters, it is seen that not all of the total possible 100 combinations will be utilized. The alpha-numeric display devices 31 in display panel 30 are responsive to fourteen bit binary information, it is necessary to convert the information of the two digit time spaced pulses into a corresponding fourteen bit binary code.

Consider as an example, the conversion of the letter "A." "A" is represented in the decimal code used in the present invention as digit 61. That is, a pulse on the "most significant" digit lead 341 occurs six time units from time zero (or in terms of the emitters, at digit "6" time) and a pulse on the "least significant" digit lead 342 occurs one time unit from zero (or at digit "1" time). The desired output of the converter will be the binary bits 1, 2, 3, 4, 5, 13, and 14 corresponding to the bars on the display panel which must be lighted to produce the letter "A" (to be explained later). In addition to the "most" and "least" significant digit input signals on leads 341 and 342, the ten output digits from leads 291 through 300 of output emitter 268 are applied to the relay contacts. The sequence of operation for letter "A" is as follows. During the output cycle of emitter 268, at digit "1" time, a pulse from the computing device is present on the "least significant" digit line 342. This pulse causes relay 331 and relay 332 to energize. At this same time, a digit "1" pulse from the output digit emitter 268 is present at contact 122–2. This pulse is conducted through contact 331B and energizes relays 324 and 325. These two relays remain energized through their hold contacts. At the end of "digit "1" time, relays 331 and 332 drop out leaving relays 324 and 325 energized. Nothing further occurs until digit "6" time when a pulse from the computing stage occurs on the "most significant" digit line 341. This pulse energizes relays 321 and 322. At the same time a digit "6" pulse from emiter 268 is present at contact 112D and energizes relay 314. Relay 314 remains energized through its hold contact. At the end of digit "6" time, relays 321 and 322 drop out, leaving relay 314 energized. At this time, relays 314, 324, and 325 are energized. All the other relays in the converter are not energized.

There are fourteen output leads from converter 35, each one associated with a separate binary digit. Each output lead is coupled to more than one of the contacts of multi-contact relays 310 through 340. For purposes of clarity, FIGS. 8C through 8P illustrate the circuit paths and the relay contact positions for a signal present condition on each of the fourteen output leads 355 through 368.

Referring to FIGS. 8C, 8D, 8E, 8F, 8G, 8O, and 8P the paths through the relays for the letter "A" will be described, that is, the paths for producing the binary bits 1, 2, 3, 4, 5, 13, and 14. For bit 1, a circuit exists through relay contact 105A, normally open and contact 338A, normally closed. This places a +48 volt signal on lead 355 (FIG. 8C). Likewise, for binary bit 2 a path exists for the +48 volt signal through contact 314C, normally open, contact 326C, normally closed, contact 339D, normally closed, and contact 329C, normally closed to lead 356 (FIG. 8D). A path for the +48 volts exists through contact 314D normally open and contact 325A normally open to lead 357 (FIG. 8E). A path exists through contact 314E normally open, contact 326G normally closed, contact 339E normally closed and contact 330B normally closed to lead 358 (FIG. 8F). A path for the +48 volts exists through contact 333E normally closed, contact 314F normally open, contact 328F normally closed, contact 339G normally closed, and contact 335E normally closed, to lead 359 (FIG. 8G). The path for the +48 volts to lead 360 FIG. 8H (binary bit 6) is inhibited by the following contacts: contact 325B normally closed, contact 316C normally open, contact 318C normaly open, and contact 322C normally open. The path for the +48 volts to lead 361 FIG. 8I (binary bit 7) is inhibited by the following contacts: contact 311A normally open, 312B normally open, 316D normally open and 318D normally open. The path for the +48 volts to lead 362 FIG. 8J (binary bit 8) is inhibited by the following contacts: 311C normally open, 312C normally open, 326K normally open, 330F normally open, 339J normally open, 316F normally open, 318E normally open and 320D normally open. The path for the +48 volts to lead 363 FIG. 8K (binary bit 9) is inhibited by the following contacts: 311D normally open, 312D normally open, 316F normally open, 318F normally open and 320E normally open. The path for the +48 volts to lead 364 FIG. 8L (binary bit 10) is inhibited by the following contacts: 311F normally open, 313A normally open, 318G normally open, and 320F normally open. The path for the +48 volts to lead 365 FIG. 8M (binary bit 11) is inhibited by the following contacts: 311F normally open, 313B normally open, 327B normally open, 330J normally open, 340B normally open, 316G normally open, 318H normally open and 320G normally open. The path for the +48 volts to lead 366 FIG. 8N (binary bit 12) is inhibited by the following contacts: 311G normally open, 313C normally open, 316H normally open, and 318I normally open. A path now exists from +48 volts through contact 330L normally closed, contact 314J normally open, contact 340F normally closed, contact 328K normally closed, contact 327I normally closed, and contact 337H normally closed to lead 367 FIG. 8O (binary bit 13). A path now exists for the +48 volts through contacts 314K nor-normally open, 325K normally open to lead 368 FIG. 8P (binary bit 14). Thus, it can be seen that there is +48 volts on binary leads 355, 356, 357, 358, 359, 367, and 368. This causes a relay in the display circuit associated with each lead to energize switching 400 cycle A.C. to the appropriate bar on the alpha-numeric display device creating the alpha-numeric character "A." At the beginning of the next output cycle, the holding voltage to all the relays in the converter is interrupted briefly by 245 in FIG. 6 opening. This resets the entire display and readies it for the next presentation.

In a similar manner it is seen that the remainder of the alphabetic characters and numerals can be produced in the form of binary bits on output leads 355 through 368. As there are a total of twenty-eight display devices 31 in display panel 30, there will be a total of twenty-eight converters identical to that shown in FIGS. 8A and 8B. As each converter has fourteen output leads, there will be a total of three hundred and ninety-two binary leads connected from converters 35 to display panel 30.

Display panel 30 includes the alpha-numeric display devices 31 and the cue lamps 33 with their associated relay circuits shown in detail in FIGS. 9 and 10.

*Alpha-Numeric Display Devices*

FIG. 9 shows the detailed circuitry of a single one of the twenty-eight alpha-numeric display devices included in the output stage. Each display device is coupled to a separate decimal to binary converter. For example, consider the input leads to display device 370 to be leads 355 to 368 from the converter of FIGS. 8A and 8B. A +48 volt signal on each one of these leads energizes the associated one of the relays 371 through 384. Each relay is, therefore, associated with a separate binary bit of the fourteen bit binary input signal. Each relay has separate normally open contacts 371A to 384A and normally closed contacts 371B through 384B. The contacts are used to switch a 250 volt, 400 cycle signal from source 385 to separate component bars of the alpha-numeric display device 370. The alpha-numeric character display is a commercially obtainable device consisting of fourteen electro-luminescent bars, each one of which may be individually illuminated by applying a signal to a contact associated with the particular bar. The contacts of the electro-luminescent bars are connected to the relay contacts armatures so that each relay 371 to 384, when energized, will cause a separate bar to illuminate. When each relay is energized, the armature moves to mate with the normally open contacts 371A through 384A coupling one side of the 250 volt, 400 cycle source 385 to the input terminal of the associated bar. The output terminal from each of the bars is connected to the other side of the 400 cycle source via lead 386. Thus, the relays that are energized will gate the voltage from source 385 to the associated bars to form a pattern on the display device. Those relays which are not energized maintain a reference potential on their particular bars through contacts 371B to 384B to keep the bars from glowing through the influence of stray capacitance, etc. Presume it is desired to display the letter "A," from the decimal to the binary translator of FIGS. 8A and 8B it is known that the following bits will be active: binary bits 1, 2, 3, 4, 5, 13, and 14. Leads 355, 356, 357, 358, 359, 367, and 368 will have a +48 volt signal present thereon which will energize relays 371, 372, 373, 374, 375, 383, and 384. The armatures of these relays will now be transferred to the normally open contacts 371A, 372A, 373A, 374A, 375A, 383A, and 384A and the 400 cycle voltage will be switched to illuminate bars B1, B2, B3, B4, B5, B13, and B14 of display device 370. It can be seen that this configuration represents letter "A." The other relays will be inactive at this time. Their armatures will be in contact with given ones of normally closed contacts 371B through 384B keeping a reference potential on bars B6, B7, B8, B9, B10, B11, and B12. This will insure that these bars will not glow because of stray signals and will avoid confusion in recognizing the pattern. The display panel 30 contains fourteen circuits and alpha-numeric character displays as shown in FIG. 1C. Each character display will receive a separate coded signal from converters 35 and in such manner will provide a visual display of either a problem for the student to reply to or a standard statement as may be stored in the reinforcing and motivating information retention means.

*Cue Lamps and Relay Circuits*

FIG. 10 is a schematic representation of the cue lamps and their associated relay circuitry. There are a total of twenty-three cue lamps 391 to 413 which are arranged in a pattern similar to that of the keys of the stenotype keyboard 5. A lighted cue lamp indicates to the student that the associated key on the keyboard should be depressed. The cue lamps are located behind a replica of the stenotype keyboard 33 on the face of the display panel 30 with the keyboard letter for each key appearing on the replica. The cue lamps are energized directly by signals from the computing stage. The decimal output code signals of the computing stage are used directly with no conversion required as was necessary for display devices 31. A decimal "9" digit signal on a given input lead indicates that the associated cue lamp is to be lighted. A decimal "8" signal indicates the lamp is not to be lighted. The input signals for the cue lamps are obtained from the output buffer 29 and are applied through leads 414 through 436. The signals applied through leads 414 through 436 are transmitted from the output buffer in time sequence, that is, the signals representing decimal "8" arrive on a line before those representing decimal "9." When any one of relays 437 through 459 is energized, it remains energized through its hold coil and associated hold contact. The relay remains held until the hold lead 256 is broken by a reset signal from relay 245 in the output control in FIG. 6. During the operation of the output digit emitters, at digit "9" time, relay 244 in the output control circuit shown in FIG. 6 is energized thereby connecting lead 256 to reference potential. Lead 256 is coupled to relays 437 through 459. At this time, if a pulse is present on any of leads 414 to 436 it will energize the associated ones of relays 437 to 459. These energized relays will remain energized through their holding coils. The energization of the relays also closes their associated second contacts 437B to 459B which switches a 6.3 volt A.C. source 460 to the associated lamp. Thus, the lamp lights and remains on as long as the relay is energized. At the beginning of the next output digit emitter cycle, relay 245 in FIG. 6 breaks the circuit through lead 256 which supplies the voltage to the holding coils. Thus, any of the relays 437 to 459 which are energized at this time will now be de-energized and the cue lamp display on display panel 30 will be removed.

What has been described is an apparatus which will teach a psycho-motor skill simultaneously with the teaching of an associated mental concept, the present example being stenotyping and the stenotype code, the apparatus being based on principles which permit the student to learn at a rate which is suited to his ability, wherein the exercises or lessons are arranged to suit the progress of the student.

The present invention has been embodied in an apparatus including a combination of electrical and mechanical components which presents problems or exercises to a student via a visual or audio mode, accepts his constructed responses via a steno-keyboard and control console under the control of a measured time. The responses are then processed and separate logical decisions are made on the basis of the responses which will determine the further presentation of problems or exercises.

While the invention has been particularly shown and described with reference to preferred embodiments thereof, it will be understood by those skilled in the art that various changes in form and details may be made therein without departing from the spirit and scope of the invention.

What is claimed is:

1. Apparatus for teaching the stenotype code and the manual skill for operating the stenotype keyboard comprising in combination: input means responsive to physical motion for producing information signals, said input means including a stenotype keyboard adapted to produce electrical signals representative of the keys thereof when said keys are depressed, a modifiable memory storage means for storing a plurality of discrete information, sensing means responsive to said signals from said input means for reading out said stored information, said sensing means including means for selecting given ones of said stored information to be read out, a first control means for controlling the transmission of said information signals from said input means to said sensing means, output means responsive to said information read out from said modifiable memory storage by said sensing means, said output means including a first visual display for presenting said information in alphabetic characters arranged in both the English language and the stenotype code notation and a second visual display for presenting said information in a symbolic form representative of the stenotype keyboard, and second control means for controlling the transmission of said information from said sensing means to said output means.

2. Apparatus for teaching the stenotype code and the manual skill for operating the stenotype keyboard according to claim 1 wherein said input means further includes means for providing a code signal for identifying separate operators of said stenotype keyboard, means for providing supervisory signals to said sensing means, and means responsive to said sensing means for displaying supervisory information to the operator of the stenotype keyboard.

3. An apparatus for teaching the stenotype code and the manual skill for operating the stenotype keyboard according to claim 1 wherein said modifiable memory storage means for storing a plurality of discrete information includes first information retention means for retaining increments of information governing the operation of the stenotype keyboard and increments of information related to the stenotype code associated with said keyboard operation, and wherein said sensing means further includes a selection control means for controlling said selection means for reading out said increments of information from said first retention means in serial and random modes.

4. An apparatus for teaching the stenotype code and the manual skill for operating the stenotype keyboard according to claim 3 wherein said modifiable memory storage means further includes second information retention means for retaining increments of information which, when presented by said first visual display, are different in form from the information transmitted from said stenotype keyboard.

5. An apparatus for teaching the stenotype code and the manual skill for operating the stenotype keyboard according to claim 4 wherein said modifiable general memory storage means further includes third information retention means for retaining a record of the increments of information retained in said second retention means, and a fourth information retention means for retaining a record of the elapsed time between the presentation of information by said visual display and the reception of information from said stenotype keyboard.

6. An apparatus for teaching the stenotype code and the manual skill for operating the stenotype keyboard according to claim 5 wherein said sensing means further includes an evaluation means responsive to said information retained in said third and fourth retention means for governing the further reading out of increments of information from said first retention means by said selection and selection control means.

7. An apparatus for teaching the stenotype code and the manual skill for operating the stenotype keyboard according to claim 6 wherein said modifiable memory storage further includes a fifth retention means for retaining reinforcing and motivating statement information.

8. An apparatus for teaching the stenotype code and the manual skill for operating the stenotype keyboard comprising in combination a first input device including a stenotype keyboard adapted to produce electrical signals representative of the keys thereof when said keys are depressed, a second input device including means for providing a code signal for identifying separate operators of said stenotype keyboard, means for providing supervisory signals, and means for displaying supervisory information to the operator of said stenotype keyboard, a modifiable memory storage means for storing a plurality of discrete information, sensing means responsive to said signals from said first and second input devices for reading out said stored information, first display means for displaying said information read out from said modifiable memory storage in alphabetic characters arranged in both the English language and the stenotype code notation, second display means for displaying said information read out from said modifiable memory storage in a symbolic form representative of the stenotype keyboard, said modifiable memory storage means including a first information retention means for retaining increments of information governing the manual skill for operating the stenotype keyboard and increments of information related to the stenotype code associated with said stenotype keyboard operation, a second information retention means for retaining increments of information which, when displayed by said first presentation means are different in form from the information transmitted from said first input device, third information retention means for retaining a record of the increments of information retained in said second retention means, a fourth information retention means for retaining a record of the elapsed time between the display of information by said first display means and the reception of information from said first input device, and a fifth retention means for retaining reinforcing and motivating statement information, said sensing means includig means for selecting given ones of said stored information to be read out, a selection control means for controlling said selection means for reading out said increments of information from said modifiable memory storage means in serial and random modes, and an evaluation means responsive to said informattion retained in said third and fourth information retention means for governing the further reading out of increments of information from said first retention means by said selection and selection control means, first control means for controlling the transmission of said information signals from said first and second input devices to said sensing means and second control means for controlling the transmission of information from said sensing means to said first and second display means.

9. An apparatus for teaching of the stenotype code and the manual skill for operating the stenotype keyboard according to claim 8 wherein said first and second display means are activated simultaneously and reciprocally in response to distinct signals from said selection means.

10. An apparatus for teaching of the stenotype code and the manual skill for operating the stenotype keyboard according to claim 9 wherein said first display means includes a plurality of alpha-numeric display devices for presenting problem exercise information in the English language and said second display means includes a plurality of electric lamps connected to form a replica of the stenotype keyboard for indicating key locations and stenotype code letters associated with said problem exercise information.

References Cited in the file of this patent

UNITED STATES PATENTS

| | | |
|---|---|---|
| 2,962,819 | Kerridge | Dec. 6, 1960 |
| 2,984,017 | Pask | May 16, 1961 |
| 3,021,611 | Goodell et al. | Feb. 20, 1962 |